(12) United States Patent
Murakami

(10) Patent No.: US 8,195,132 B2
(45) Date of Patent: Jun. 5, 2012

(54) INFORMATION TRANSFER CONTROL APPARATUS AND INFORMATION TRANSFER CONTROL METHOD FOR TRANSFERRING CONTENT

(75) Inventor: Norio Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 350 days.

(21) Appl. No.: 12/560,556

(22) Filed: Sep. 16, 2009

(65) Prior Publication Data
US 2010/0003970 A1 Jan. 7, 2010

Related U.S. Application Data

(63) Continuation of application No. PCT/JP2007/056410, filed on Mar. 27, 2007.

(51) Int. Cl.
*H04W 4/00* (2009.01)
(52) U.S. Cl. .............. 455/413; 455/404.2; 455/456.1; 455/435.1; 455/466
(58) Field of Classification Search .......... 455/413, 455/466, 404.2, 456.1, 435.1
See application file for complete search history.

(56) References Cited

U.S. PATENT DOCUMENTS

| | | | | |
|---|---|---|---|---|
| 7,200,394 | B2 * | 4/2007 | Aoki et al. ............... | 455/435.1 |
| 2004/0158565 | A1 * | 8/2004 | Kakuta et al. ............ | 707/10 |
| 2006/0143453 | A1 * | 6/2006 | Imamoto et al. .......... | 713/169 |
| 2006/0224684 | A1 | 10/2006 | Miedema et al. | |

FOREIGN PATENT DOCUMENTS

| | | |
|---|---|---|
| JP | 2001-022371 | 1/2001 |
| JP | 2004-120722 | 4/2004 |
| JP | 2004-282295 | 10/2004 |
| WO | 2004/091158 | 10/2004 |

OTHER PUBLICATIONS

International Search Report dated Nov. 6, 2007, from the corresponding International Application.

* cited by examiner

*Primary Examiner* — Pierre-Louis Desir
(74) *Attorney, Agent, or Firm* — Fujitsu Patent Center

(57) ABSTRACT

An information transfer control apparatus includes a storage unit storing an ID generating function for each distribution process group having at least one distribution process representing information transfer between plural communication terminals; an assigning unit assigning identification information to the distribution process using the ID generating function; a determining unit determining the distribution process group, the ID generating function, and the identification information associated with a request in response to receiving, from a first one of the communication terminals, the request for the information transfer from the first one of the communication terminals to a second one of the communication terminals and determining whether to allow information distribution; and a generating unit generating new identification information based on the determined ID generating function and sending a digital item containing the new identification information to the second one of the communication terminals when the determining unit allows the information distribution.

18 Claims, 21 Drawing Sheets

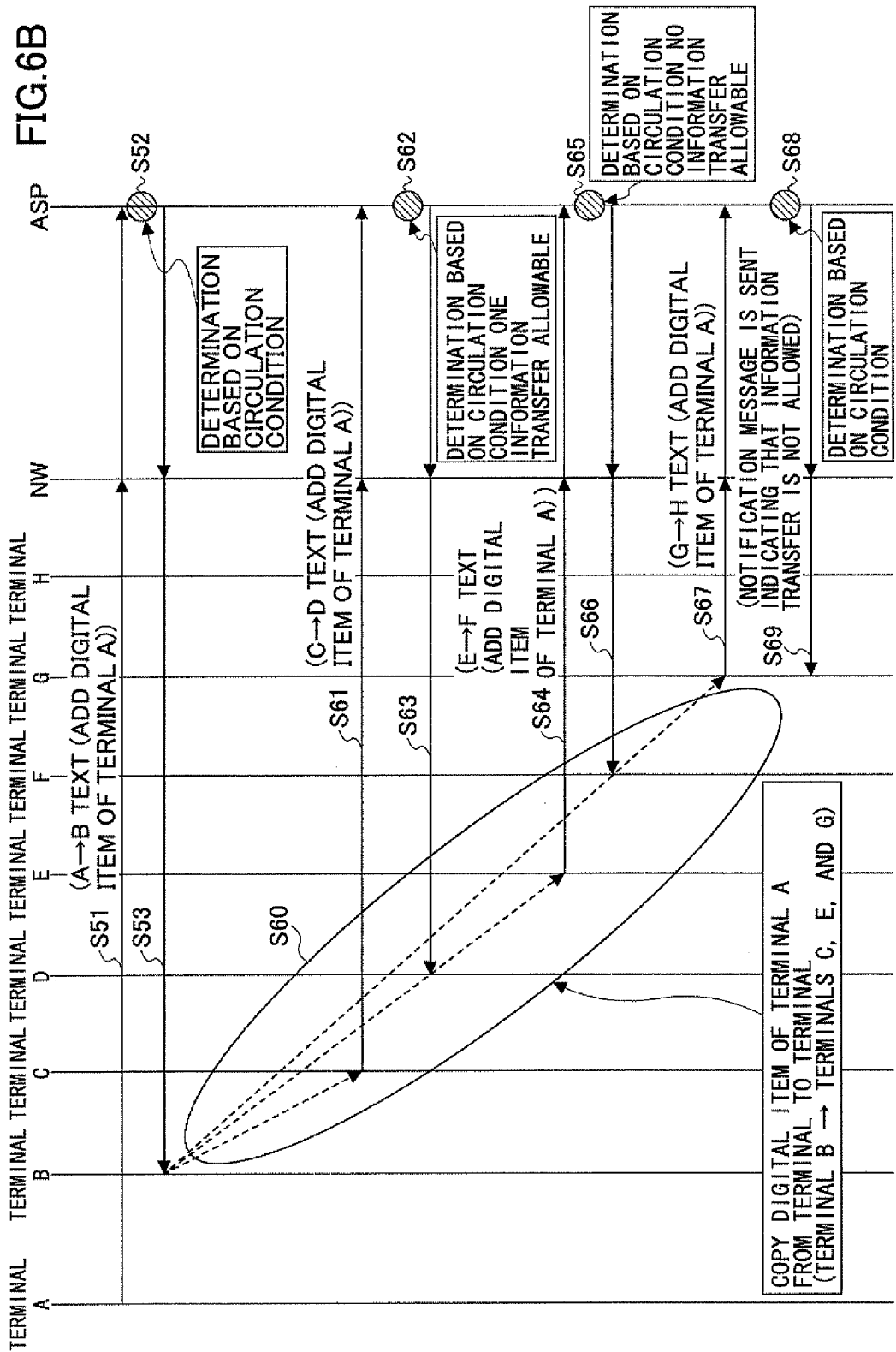

| INDEX INFORMATION | ID GENERATING FUNCTION |
|---|---|
| INDEX 1 | $f_1(x)$ |
| INDEX 2 | $f_2(x)$ |
| ⋮ | ⋮ |

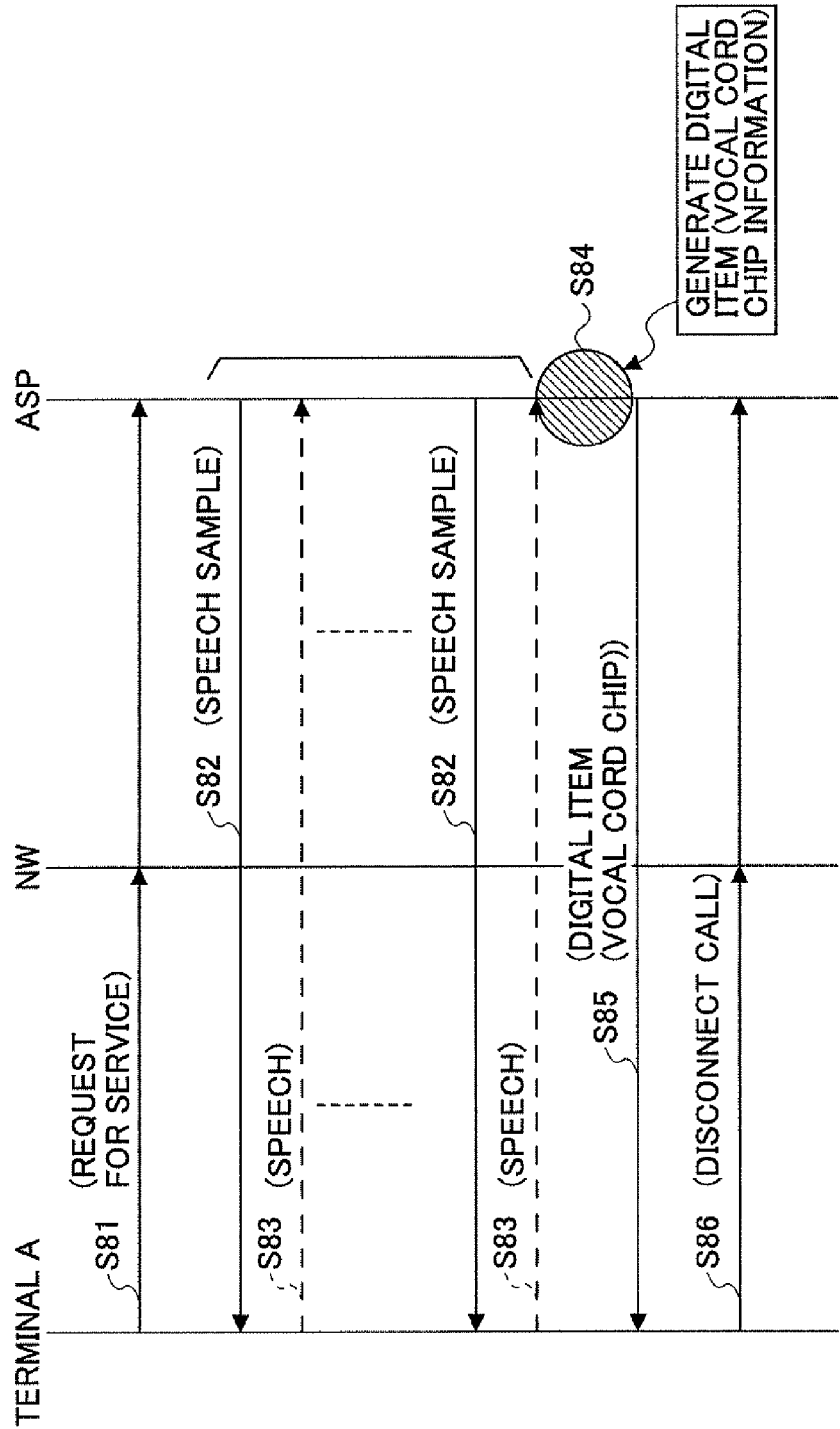

INFORMATION TRANSFER CONTROL APPARATUS AND INFORMATION TRANSFER CONTROL METHOD FOR TRANSFERRING CONTENT

CROSS-REFERENCE TO RELATED APPLICATION

This application is a U.S. continuation application filed under 35 U.S.C. 111(a) claiming benefit under 35 U.S.C. 120 and 365(c) of PCT application JP2007/056410, filed on Mar. 27, 2007, the entire contents of which are incorporated herein by reference.

FIELD

The embodiment discussed herein is related to an information transfer control apparatus and an information transfer control method for transferring a content.

BACKGROUND

Controversial unauthorized copying and illegal circulation of digital content exchanged via the Internet are known. Many technologies such as electronic watermarks and log management methods have been discussed as means to prevent the problematic behavior. Furthermore, technologies of solving problems residing in the methods and enabling smooth and secured operations of content movements using information circulation units between individuals have been discussed.
Patent Document 1: Japanese Laid-Open Patent Publication No. 2004-120722.

SUMMARY

According to an aspect of the present invention, there is provided an information transfer control apparatus used in a communication system in which plural communication terminals send and receive content from each other via a network. The information transfer control apparatus includes a storage unit that stores an ID generating function for each distribution process group including at least one distribution process representing an information transfer between the plural communication terminals; an assigning unit that assigns identification information to the distribution process by using the ID generating function; a determining unit that determines the distribution process group, the ID generating function, and the identification information associated with a request in response to receiving, from a first one of the plural communication terminals, the request for the information transfer to be carried out from the first one of the plural communication terminals to a second one of the plural communication terminals and determines whether to allow information distribution; and a generating unit that generates new identification information based on the determined ID generating function and sends the new identification information to the second one of the plural communication terminals when the determining unit allows the information distribution.

The object and advantages of the present invention will be realized and attained by means of the elements and combinations particularly pointed out in the claims.

It is to be understood that both the foregoing general description and the following detailed description are exemplary and explanatory and are not restrictive of the present invention, as claimed.

BRIEF DESCRIPTION OF DRAWINGS

FIG. 6B is a flowchart illustrating a case in which information transfer against the intention of the information provider is not allowed;

FIG. 14A is a flowchart illustrating a procedure example of preparing a digital item including biometric information;

DESCRIPTION OF EMBODIMENTS

Figure 1A:
FIG. 1A is a diagram schematically illustrating the process of generating a vocal cord chip.

With the widespread use of mobile information services including electronic mail besides the proliferation of the Internet, the communication amount of text messages (electronic mail) in place of voice has increased. Moreover, a voice-reading function or the like that reads out text messages under mobile environments has become pervasive.

In terms of the voice-reading function that reads out text messages, fixed voice or speech patterns provided by individual equipment sets or systems are generally used. Therefore, the fact that read-out voices create a dry impression cannot be denied. The technology of arbitrarily or freely reading out text messages through the voice of a text message sender or a pseudo voice based on the intention of the text message sender has not been in widespread use.

Anyone would agree with that an original communication tool under mobile environments is a "voice." It is therefore conceived that there has been a high demand for the service of reading out text messages through the voice of a text message sender or a similar (pseudo) voice and the service of reading out text messages through favorite sounds (for example, the voices of actors/actresses) that the user likes. However, it is not preferred to circulate digital information featuring the voices (biometric information) of specified individuals on an existing network from the viewpoint of privacy protection, security, or the like.

Patent Document 1 is configured to prevent the unauthorized copying and illegal circulation of content in such a manner that inherent information on the user is set so as to correspond to digital content divided and encrypted before information is transferred and its linkage orders and linkage positions are separately restored. With this technology, the unauthorized copying or the like may be prevented to some degree. However, it is feared that the content would be circulated on a network without limitation once it is initially circulated.

An embodiment of the present invention aims to circulate a digital item based on biometric information on the user of an information terminal (including a mobile terminal and a fixed terminal) such as a cell phone on a network, thereby providing communication content with added value such as "humanity" and self identification with respect to circulation content (for example, electronic mail). The "biometric information" refers to the body identifier of an individual and represents a concept including a fingerprint, a palm shape, a hand vein, a retinal vein, an iris, a voice pattern, DNA, or the like serving as biometric information. The "digital item" refers to information or content to be widely distributed regardless of whether it is provided for a fee or free of charge. The digital item based on the biometric information could be personal information for identifying the provider (user) of the digital item and contain a copyrighted work expressed by the person involved. Therefore, privacy protection and security countermeasures in a circulation process on the network must be sufficiently taken into consideration. Furthermore, from the viewpoint that the circulation process is desired to be in widespread use, the circulation process is preferably based on an economical method.

In the following description, the digital item includes the biometric information for the sake of convenience, but the embodiment of the present invention can be widely applied to the digital item or the like to which any restrictive condition is imposed in a network circulation (for example, copyrighted content).

Figures 8, 9:
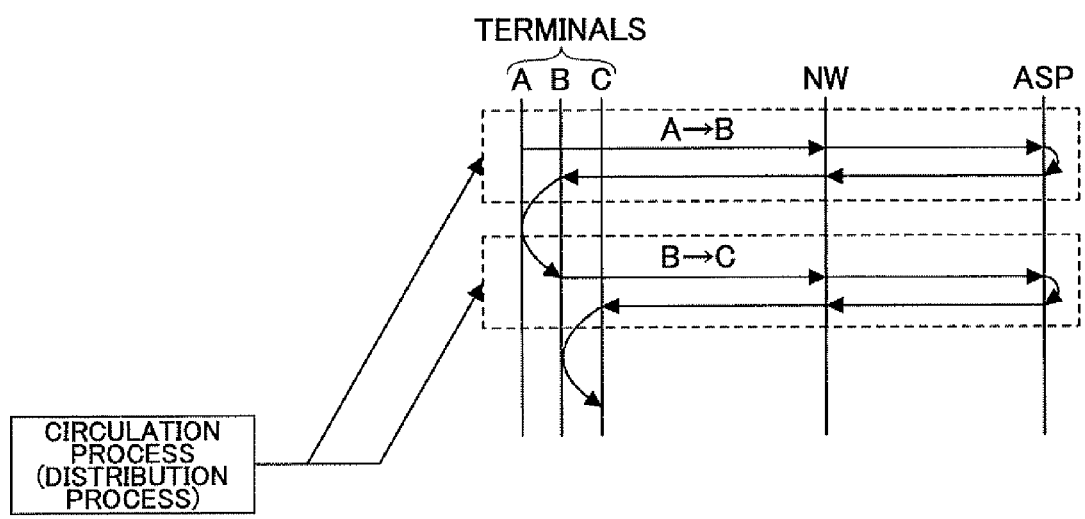
FIG. 8 is a diagram illustrating a correspondence relationship between index information and an ID generating function.
FIG. 9 is a diagram illustrating the concept of a circulation process.

According to the embodiment of the present invention, a server system or an application service provider ASP uniquely determines plural circulation-condition-identifier (ID) generating functions (hereinafter referred to as ID generating functions), and the circulation identifier (ID) calculated by the ID generating function is added to the digital item including the biometric information. The circulation identifier can be used only once for each circulation process. Here, as illustrated in FIG. 9, the "circulation process" or a "distribution process" refers to information transfer made or to be made between two communication terminals via the server system. Since the information transfer is managed together with the circulation identifier that can be used only once for each circulation process, it is possible to effectively prevent the leakage of the digital item on the network against the intention of an information provider and effectively protect private information.

The embodiment of the present invention makes it possible to effectively and economically provide privacy protection (security countermeasures) for the digital item based on the biometric information on a specified individual in the network circulation, provide a communication service with specified or pseudo added values of the individual, and control the privacy protection (security countermeasures) in the circulation process.

Let it be assumed that the digital item is illegally acquired (for example, illegally copied) in the circulation process on the network, and the person who illegally acquires the digital item attempts to circulate the digital item on the network as it is. Since the server system ASP collectively manages information transfer on the network, any information transfer via the network passes through the server system ASP. The server system ASP detects whether the information transfer violates the condition by which the circulation identifier embedded in the digital item can be used only once for each circulation process, thereby making it possible to prevent the digital item from being further circulated on the network.

Furthermore, even if the number of the circulation identifier is decoded, it is unknown what ID generating function and what argument are used for generating the number. This is because the ID generating function is uniquely determined by the server system ASP. Accordingly, the illegal circulation of the information together with the valid circulation identifier (ID) is not allowed in the next circulation process. Thus, the digital item including the biometric information (for example, voice information) indicating the feature of an individual can be protected in the circulation process on the network.

According to the embodiment of the present invention, the server system ASP collectively manages and controls the circulation of the digital item based on the biometric information on the network, thereby making it possible to protect private information. The server system ASP uniquely determines the plural ID generating functions, such as the Euler's prime number polynomial expression, and determines the value of an ID valid only once for each circulation process based on a circulation condition CC (such as time). The server system ASP handles the circulation process of the digital item at all times and manages the information transfer by using the value of the ID assigned for each circulation process, thereby making it possible to prevent the unauthorized acquisition, unauthorized misappropriation, and unauthorized circulation of the digital item on the network.

For the sake of concise description, the following digital item includes the biometric information based on voice information, but the biometric information is not necessarily limited to a "voice." When the features (such as voice quality, a voice, and a tone) of the voice of a speaker is analyzed by reading of specific sentence, the Say-after method, or the like, various voice parameters indicating the features such as the voice and the tone of the speaker can be extracted. Since voice analysis per se is a known technology and the embodiment of the present invention does not depend on a specific voice analysis method, a specific voice synthesizing method, or the like, the description of the voice analysis per se is omitted. With the application of the known voice analysis technology, the extracted speaker's voice parameters can be converted into formats capable of being circulated on the network as the speaker's digital information.

In the following description, the digital information indicating the feature of the voice of a speaker converted into a format capable of being circulated and the digital information converted into a format capable of being installed in a (mobile) information terminal are called "vocal cord chips VCC." The voice and the quality of the voice serving as parameters forming the vocal cord chip VCC are analyzed by technologies such as the HHM (Hidden Markov Model) method to which speaker interpolation is applied and the vector quantization method. Such a "vocal cord chip VCC" can be circulated on the network as a digital item (for example, music content such as an incoming-call melody) of the biometric information.

FIG. 1A conceptually illustrates a state in which the spoken voice SV of the user spoken in accordance with, for example, a speech sample is converted into a vocal cord chip VCC. The digital item to which the embodiment of the present invention can be applied is not limited to voice, but any appropriate biometric information may be used.

It is assumed that the (mobile) information terminal having the voice-reading function has a text reading function, a standard voice source (White Voice) an artificial vocal cord function, and the like necessary for implementing the voice-reading of a text message. As for the standard voice source, its generation method and features are specified. Furthermore, the standard voice source refers to an "artificial voice source easily processed into the voices of all people." However, the embodiment of the present invention does not limit a method for implementing the standard voice source. Furthermore, the (mobile) information terminal assumed in the embodiment of the present invention may have plural standard voice sources (for example, the voice sources of men, women, and children). The artificial vocal cord function is the function of processing the standard sound source to generate the voice of an individual. That is, the artificial vocal cord function can generate the pseudo voice of a specific person from the frequency characteristic of the voice of the individual, the distribution strength of harmonics, a tone, or the like based on the various parameters registered in the vocal cord chip VCC.

When the spoken voice SV (generated by reading out a specific sentence, the Say-after method, or the like) spoken by the user who uses a service is received, the feature of the voice is extracted according to the analysis of the spoken voice SV spoken by the user, and the parameters indicating the feature are determined to form the "vocal cord chip VCC" (biometric information on the user) and returned to the user (client).

Let it be assumed that the user (sender) who uses a service attaches the vocal cord chip VCC indicating the feature of the spoken voice SV spoken by the user at the time of sending a text message (electronic mail or the like). When the (mobile) information terminal of a recipient has the voice-reading function of the text message, the recipient can hear the text message read out by the spoken voice SV spoken by the user (sender).

Furthermore, if the vocal cord chips VCC of celebrities, famous persons, or the like are sold in the same manner as "incoming-call melodies," real voice applications such as reading out a text message and a wake-up call by these persons can be developed. Alternatively, the dubbing of movies in Japanese or the like can be heard through actors' or actresses' real voices or similar voices. Moreover, it is also possible to develop an application that uses the vocal cord chip VCC as a digital voice pattern serving as an identification "key" to prevent a person from disguising as another person.

Next, a description is made of the principle of circulation management for the digital item according to the embodiment of the present invention.

Figure 1B:
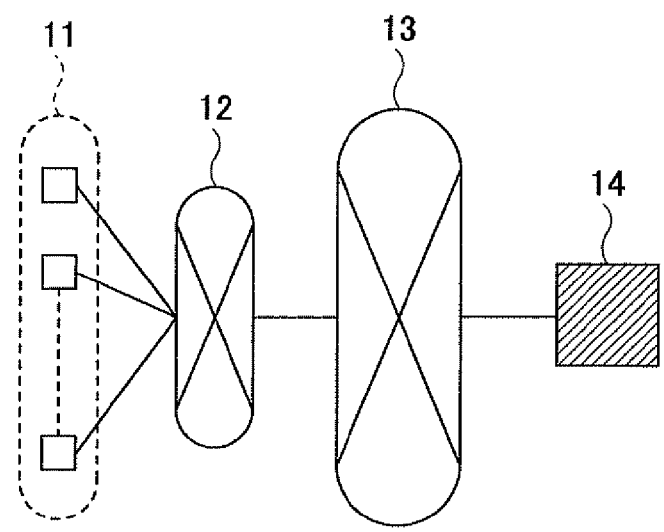
FIG. 1B illustrates a basic conceptual diagram of a system according to an embodiment of the present invention.

FIG. 1B illustrates a basic conceptual diagram of a network system for providing the service according to the embodiment of the present invention. However, the system may be configured by more, less, or other function elements depending on the mode and content of the service.

In FIG. 1B, an information terminal 11, a public (mobile) communication network (access network) 12, a backbone network 13, and an application service provider 14 are illustrated.

The information terminal 11 is typically a cell phone, but may more generally be a mobile terminal or a fixed terminal. For example, the information terminal 11 may include equipment connected to various communication networks. Furthermore, the information terminal 11 may be divided so that a communication function and a display function are executed by separate equipment sets. The information terminal 11 can perform voice communication and data communication within the public (mobile) communication network 12. The information terminal 11 has functions (of accessing, displaying, and reproducing voice signals to the World Wide Web including data such as text, still image, moving image, voice, and music and sending and receiving electronic mail) as an Internet connection terminal.

The connection of the public (mobile) communication network 12 to the information terminal 11 is established when the information terminal 11 performs communication. When the information terminal 11 sends and receives data via the Internet, the public (mobile) communication network 12 has the function of relaying the data in the network. Note that the embodiment of the present invention is not limited to the public (mobile) communication network 12, but may be applied to, for example, a fixed communication network.

The backbone network 13 is typically the Internet, but may refer to other communication networks. The Internet is a communication network for sending and receiving data through a TCP/IP protocol. The information terminal 11 and the server system (application service provider ASP) 14 are connected to the Internet, thereby making it possible to send and receive information to and from various servers and other terminals.

The server system ASP 14 may constitute a part of the Internet. The server system 14 has the function of a general Internet server and various processing functions of providing the service according to the embodiment of the present invention. The server system ASP 14 appropriately provides the information terminal 11 with the service via the Internet 13 and the public (mobile) communication network 12.

An information providing trader is a natural person or a company that intends to provide the user having the information terminal 11 with the digital item and requests the server system ASP 14 to provide the digital item. The information providing trader and the user may be collectively called an "information provider." The information provider has an information processing function, a terminal (for example, a personal computer) for inputting and outputting information, or the like necessary for establishing a connection to the server system ASP 14. The information provider can be connected to the server system ASP 14 not only via the Internet and the public (mobile) communication network 12 but also via an intranet.

Figure 2:
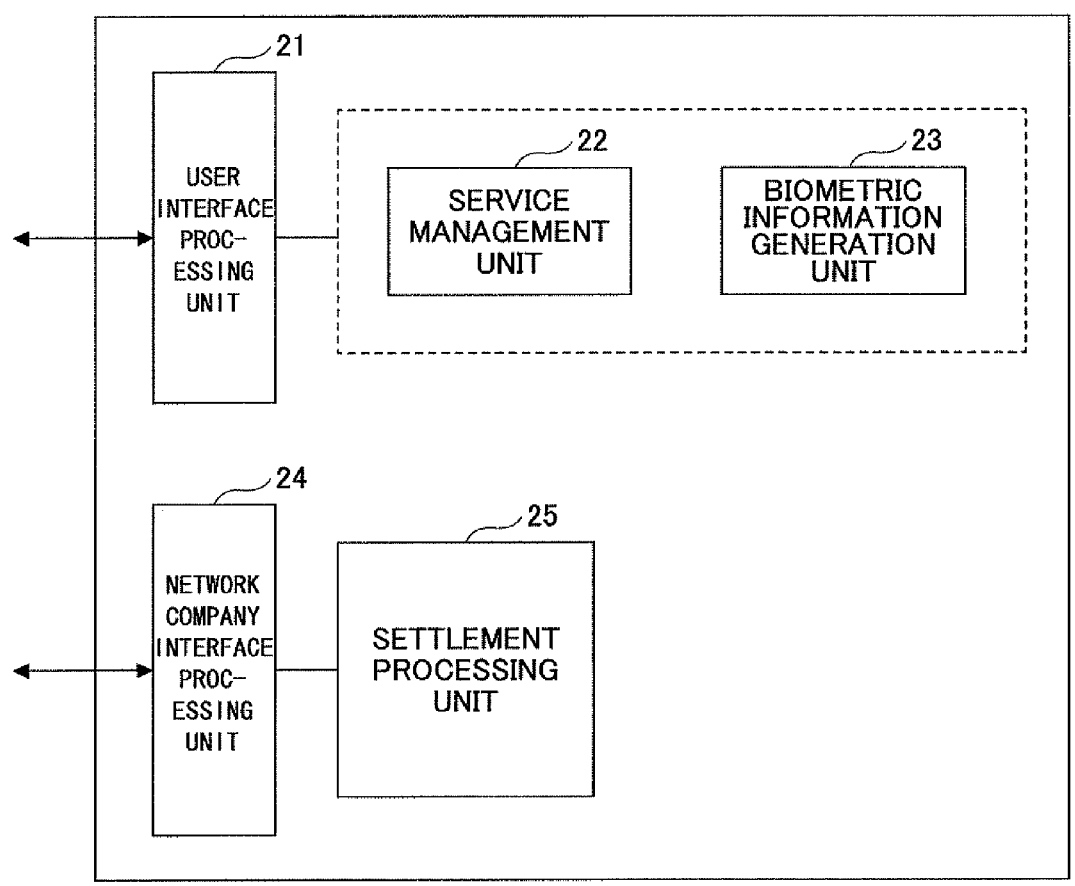
FIG. 2 is a function block diagram of a server system ASP.

FIG. 2 illustrates a schematic block diagram of the server system ASP 14. Each processing block in FIG. 2 does not express an implementation form itself, but only illustrates an element for executing a function in a conceptual manner (the same applies to other block diagrams in figures other than FIG. 2). In FIG. 2, a user interface processing unit 21, a service management unit 22, a biometric information generation unit 23, a network company interface processing unit 24, and a settlement processing unit 25 are illustrated.

The user interface processing unit 21 takes an interface with the user (information provider). The interface enables the circulation of the digital item provided or desired to be widely spread from the information provider. Furthermore, the interface can receive information on the information provider such as an attribute and an area.

The service management unit 22 plays a central role in the information distribution service according to the embodiment of the present invention. The function of the service management unit 22 is described below.

Figure 3:
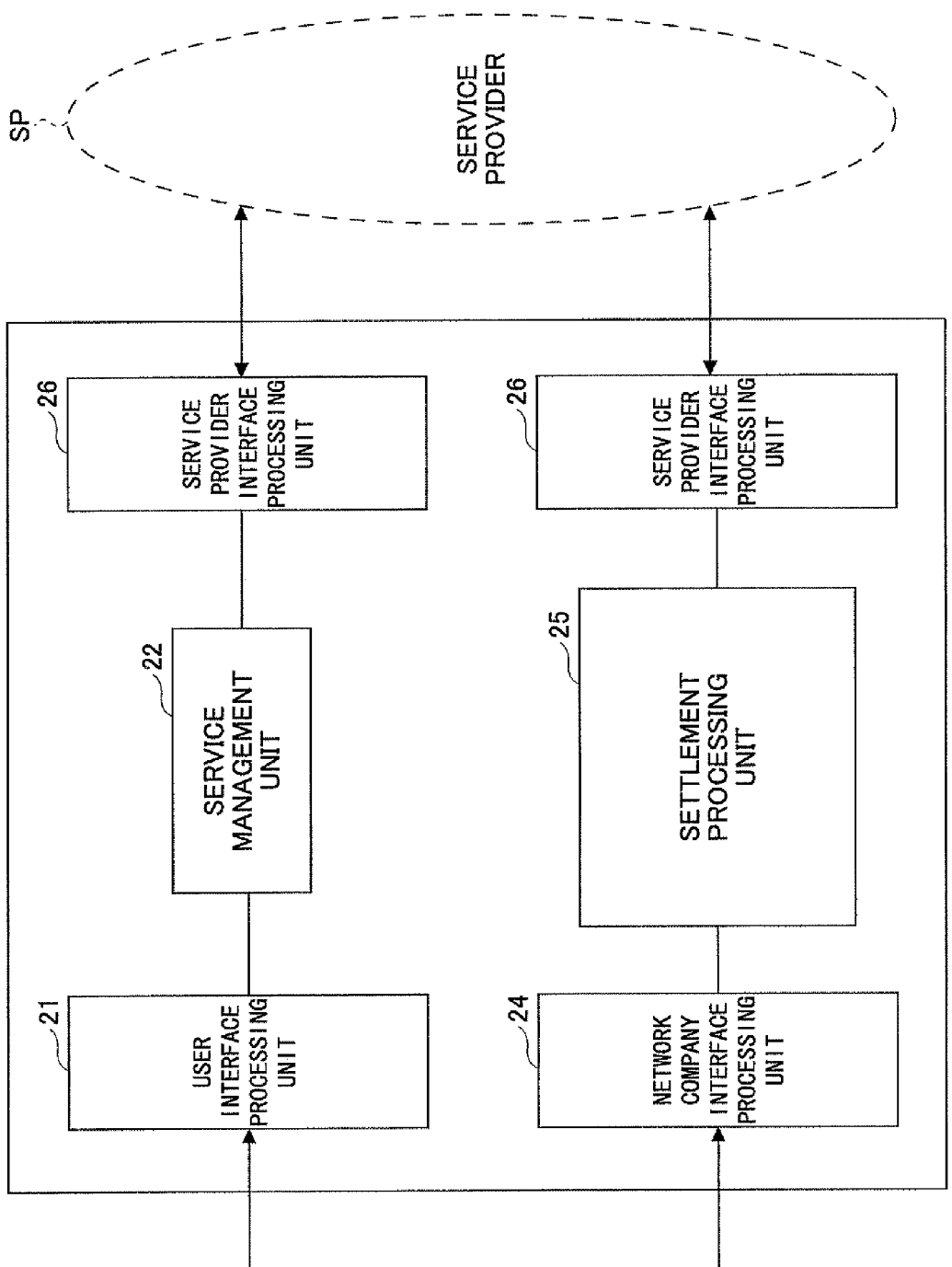
FIG. 3 is another function block diagram of the server system ASP.

The biometric information generation unit 23 prepares or generates the biometric information on the information provider in accordance with a request made by the information provider. The biometric information generation unit 23 is not necessarily provided in the server system ASP 14. As illustrated in FIG. 3, a service provider SP other than the server system ASP 14 may prepare the biometric information.

The network company interface processing unit 24 has an interface with, for example, the network company of the public (mobile) communication network 12.

The settlement processing unit 25 performs billing processing occurring when the service for easily and safely distributing the digital item of the biometric information according to the embodiment of the present invention is used.

Figure 4:
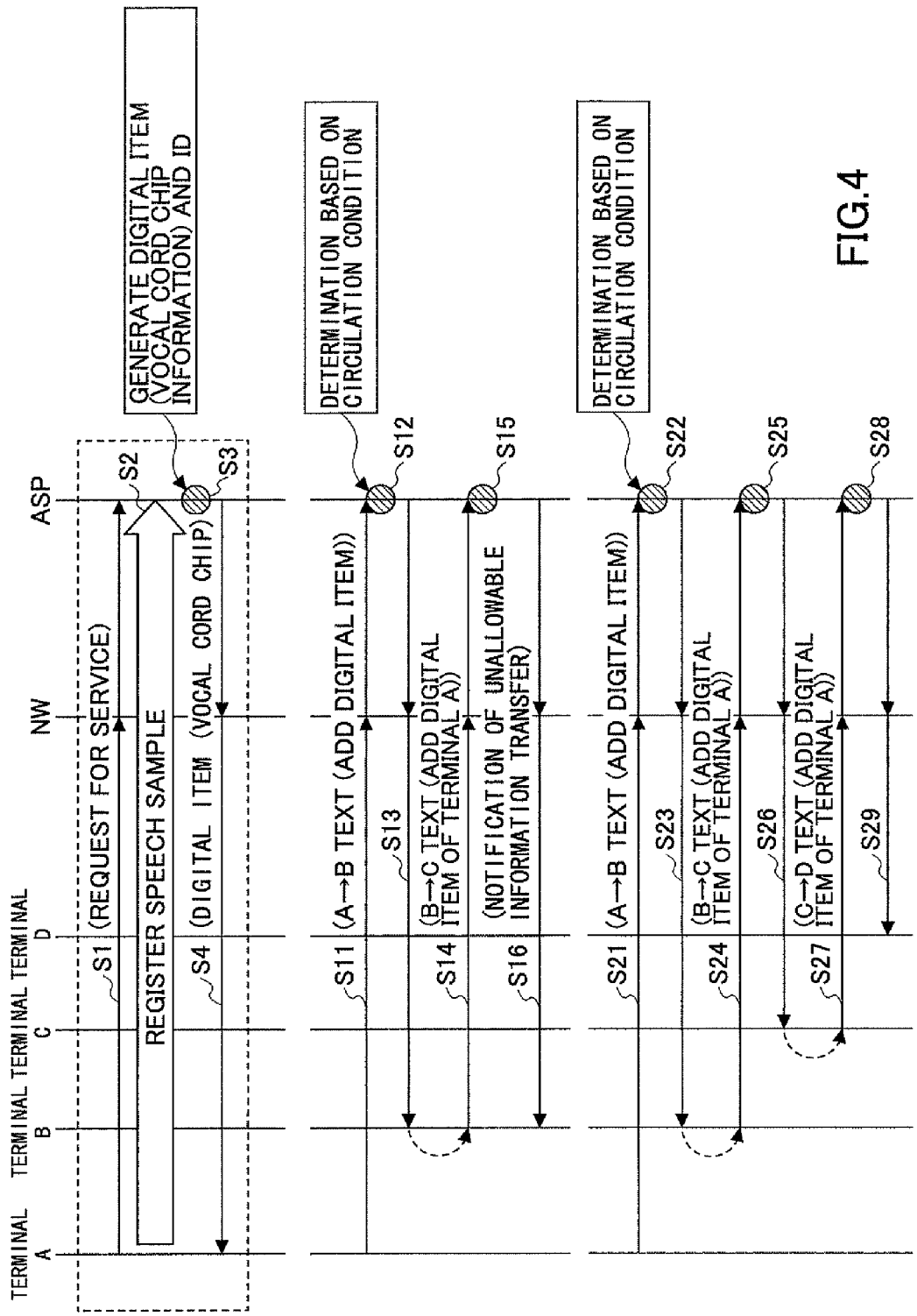
FIG. 4 is a flowchart illustrating an operations example according to the embodiment of the present invention.

FIG. 4 illustrates a processing sequence for generating the vocal cord chip VCC of the user (of terminal A) and distributing the same on the network. In FIG. 4, the public (mobile) communication network is expressed as "NW" and the server system is expressed as "ASP."

The area encircled by dashed lines in FIG. 4 illustrates a state until the terminal A acquires the vocal cord chip VCC. In step S1, the terminal A (information provider) requests the server system ASP to provide the service. In step S2, the terminal A registers a voice (speech) spoken in accordance with the speech sample sent from the server system ASP. In step S3, the server system ASP generates the vocal cord chip VCC based on the registered voice. In step S3, a correspondence relationship between the generated vocal cord chip VCC (digital item), the circulation process for circulating the digital item, the ID generating function, and index information IND (which are described below) is established. In step S4, the generated vocal cord chip VCC is sent to the terminal A, thus completing the sequence for preparing the vocal cord chip VCC.

As an example, let it be assumed that the user of the terminal A wants to transfer a text message to terminal B together with the vocal cord chip VCC. At this time, the user does not want to circulate the digital item to users other than the user of the terminal B. The circulation identifier (ID) is set for each circulation process so that such an intention of the user is reflected in the above correspondence relationship.

In step S11, the text message, the vocal cord chip VCC, and the ID are sent to the terminal B (i.e., the digital item together with the ID is sent from the terminal A). The signal is directed to the terminal B via the network, but the information transfer via the network must pass through the server system ASP. In step S12, the server system ASP determines whether the information transfer from the terminal A to the terminal B is allowed based on the circulation condition CC. The determination is made according to the correspondence relationship prepared in step S3 and the ID received from the terminal A. A specific method for making the determination is described below. In this case, the information transfer from the terminal A to the terminal B is allowed because it conforms to the intention of the user of the terminal A. As a result, the signal including the text message and the vocal cord chip VCC is transferred from the server system ASP to the terminal B. The user of the terminal B receives the vocal cord chip VCC in addition to the text message and is allowed to hear the voice as if it were read out by the user of the terminal A.

Meanwhile, the user of the terminal B may not recognize the fact that the user of the terminal A does not want to circulate the digital item together with the vocal cord chip VCC to users other than the user of the terminal B. In step S14, the signal including the digital item is sent from the terminal B to terminal C (i.e., the digital item together with the ID is sent from the terminal B). The signal includes the above ID. As described above, the information transfer via the network must pass through the server system ASP. In step S15, the server system ASP determines whether the information transfer from the terminal B to the terminal C is allowed based on the circulation condition CC in the same manner as step S12. The determination is made according to the correspondence relationship and the received ID. In this case, the information transfer is forbidden because it does not conform to the intention of the user of the terminal A. As a result, in step S16, the terminal B is notified with a message indicating that the information transfer is not allowed.

There would also be a case in which the user of the terminal A allows the circulation process not only once but also n times, but the user does not want to circulate the information transfer of the digital item more than n times. In this case, the above correspondence relationship is established so as to reflect this condition. The digital item is transferred from the terminal A to the terminal B (steps S21, S22, and S23) for the first time, transferred from the terminal B to the terminal C (steps S24, S25, and S26) for the second time, and transferred from the terminal C to terminal D (steps S27, S28, and S29) for the third time. The same procedure as the above is repeatedly performed until the digital item is transferred n times. In this case, the ID (ID-1) included in the signal in step S21, the ID (ID-2) included in the signal in step S24, and the ID (ID-3) included in the signal in step S27 are different from one another, but they are generated based on the same ID generating function. In steps S22, S25, and S28, the server system ASP determines whether the information transfer is allowed based on these IDs and the above correspondence relationship. If it is determined that the information transfer is allowed, the server system ASP generates a new ID and transfers the digital item to the destination terminal together with the generated new ID.

There would also be a case in which the user of the terminal A allows the unlimited circulation of the digital item.

Figure 5:
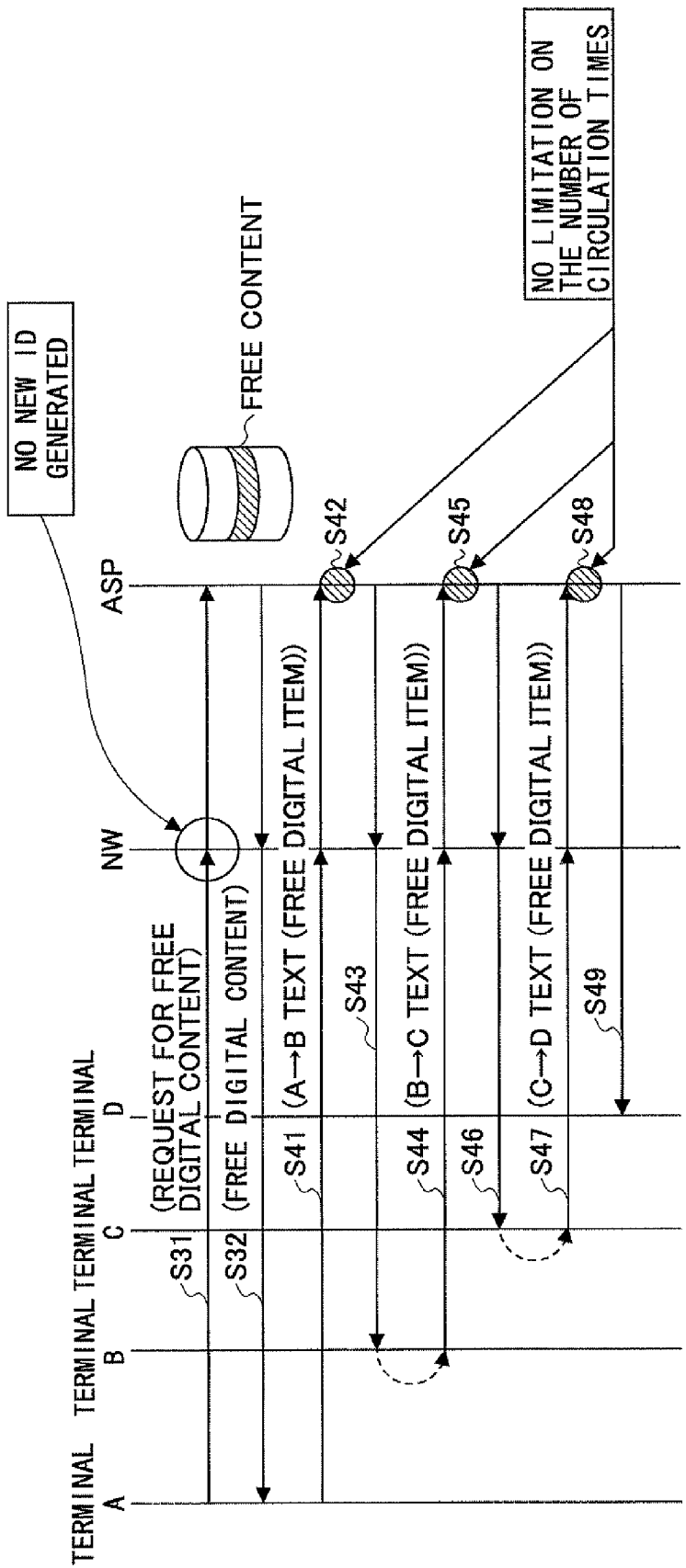
FIG. 5 is a flowchart illustrating a case in which free content is transferred.

FIG. 5 is a processing sequence illustrating such a case. In steps S31 and S32, the vocal cord chip VCC and a text message are prepared as examples of the digital item. When terminal A transfers the signal including the digital item to terminal B, the signal is sent to the server system ASP. The sequence in FIG. 5 is different from the sequence in FIG. 4 in that determination is made as to whether the information transfer is allowed without limitation. If it is determined that the information transfer is allowed without limitation, the server system ASP does not generate a new ID and the information transfer is allowed at all times.

Figure 6A:
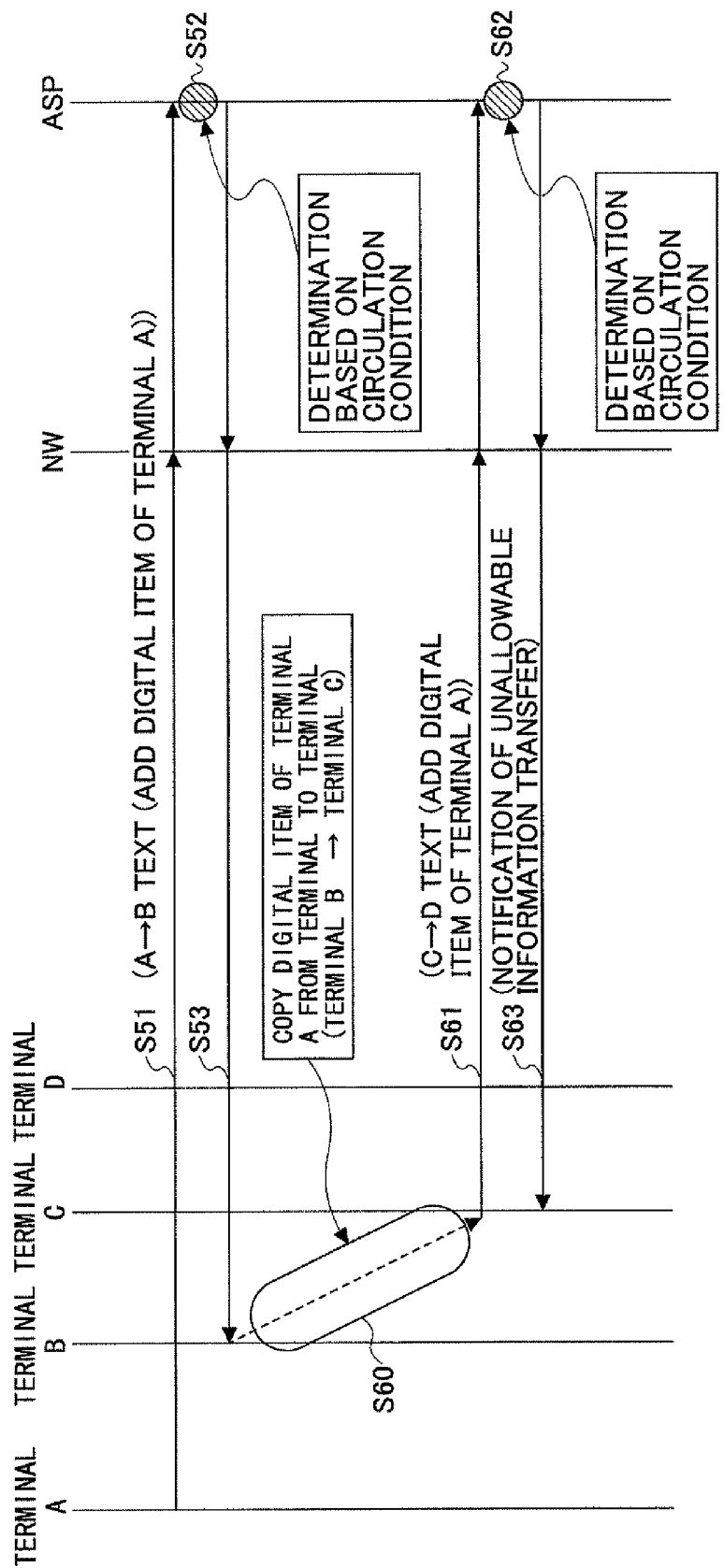
FIG. 6A is a flowchart illustrating a case in which information transfer against the intention of an information provider is not allowed.

In an example illustrated in FIG. 6A, the digital item is transferred from terminal A to terminal B together with a valid ID similar to steps S1, S12, and S13 in FIG. 4. Here, let it be assumed that the digital item is not allowed to be further transferred from the terminal B to other terminals. The processing sequence until this step is the same as the processing sequence illustrated in FIG. 4. In FIG. 6A, the digital item is transferred from the terminal B to terminal C without passing through the network (step S60). The user of the terminal B may perform such information transfer by, for example, giving a memory stick to the user of the terminal C, taking advantage of infrared communication, and establishing communication by Bluetooth. Then, let it be assumed that the terminal C attempts to transfer the digital item to terminal D via the network (step S61). Since the ID used in this information transfer is the same as that used in the circulation process from the terminal A to the terminal B, the server system ASP can determine that the ID received from the terminal C is not a valid ID in this circulation process. As a result, the terminal C is notified with a message indicating that the information transfer from the terminal B is not allowed.

Also, in an example illustrated in FIG. 6B, the digital item is transferred from terminal A to terminal B together with a valid ID similar to steps S11, S12, and S13 in FIG. 4. In this example, however, let it be assumed that the circulation of the digital item is allowed up to three times. Similar to step S60 in FIG. 6A, the digital item is transferred from the terminal B to terminal C, terminal E, and terminal G without passing through the network. First, the circulation process from the terminal C to the terminal D is allowed in step S62. At this time, it is confirmed that the information transfer of the digital item is allowed once in the following circulation process. The circulation process from the terminal E to terminal F is allowed in step S65. At this time, it is confirmed that the transfer of the digital item is not allowed in the following circulation process. Accordingly, the circulation process from terminal G to terminal H is not allowed in step S68, and the following transfer of the digital item is forbidden.

As illustrated in FIGS. 6A and 6B, even if it is possible to transfer and copy the digital item between the terminals, the server system ASP manages the circulation condition CC in the circulation process specified for each digital item. Therefore, the unauthorized circulation of the digital item can be prevented.

Figure 7:
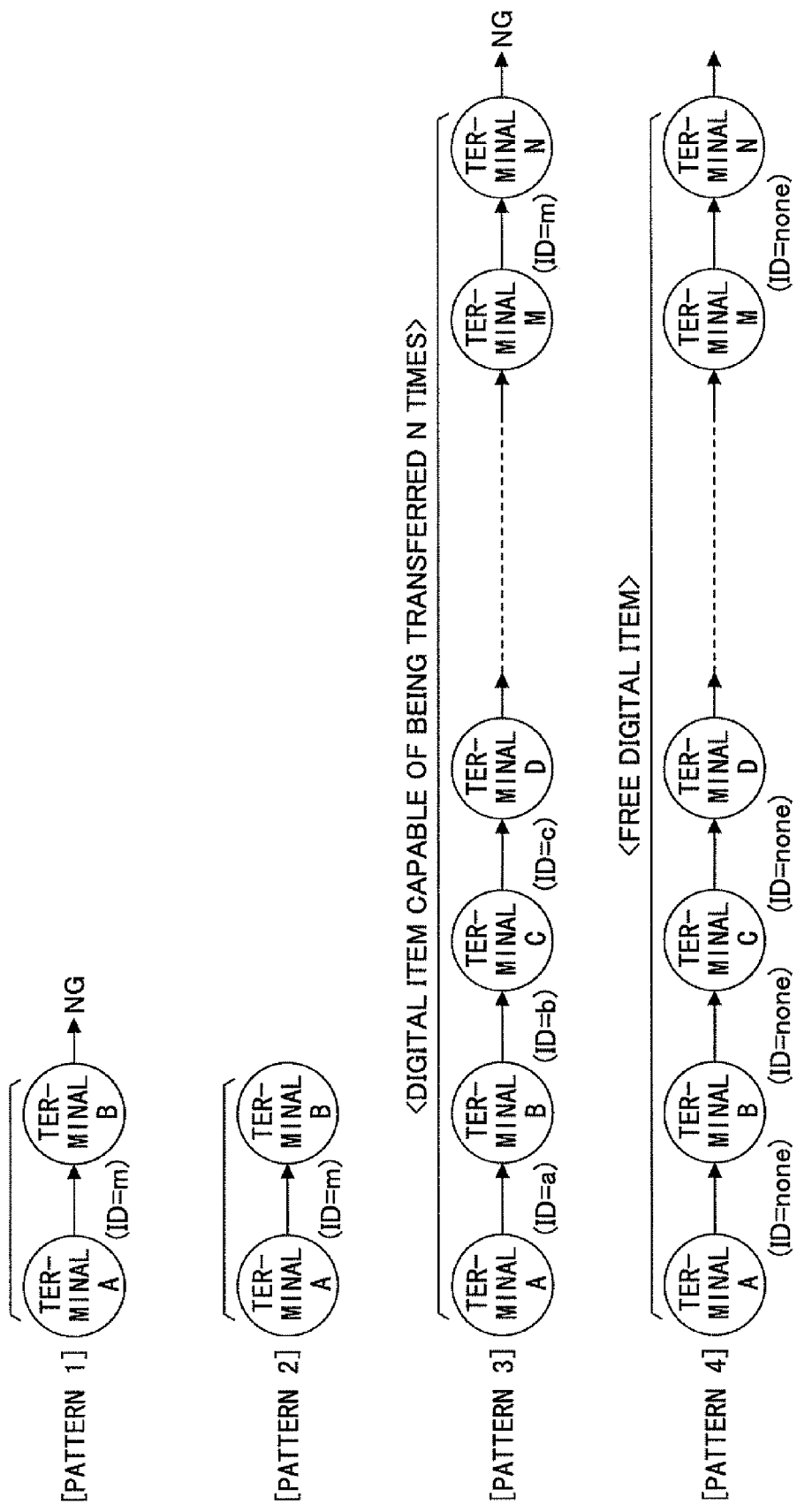
FIG. 7 is a diagram illustrating various information transfer patterns.

FIG. 7 illustrates pattern examples of various circulation processes. Patterns 1 and 2 illustrate states in which the circulation (information transfer between terminals via the server system ASP) of the digital item is allowed only once. In the pattern 1, the digital item is transferred from terminal A to unspecified terminal B. This circulation process corresponds to the processing from step S12 to step S16 in FIG. 4. In the pattern 2, the digital item is transferred from the terminal A to specified terminal B. In this case, the digital item is not further transferred because the terminal B recognizes the intention of the terminal A. A pattern 3 illustrates a state in which the circulation process is allowed up to N times, and this circulation process corresponds to the processing from step S21 to step S29 in FIG. 4. A pattern 4 allows the circulation process without limitation, and this circulation process corresponds to the sequence in FIG. 5.

Next, a description is made of operations mainly performed by the server system ASP.

Figure 10:
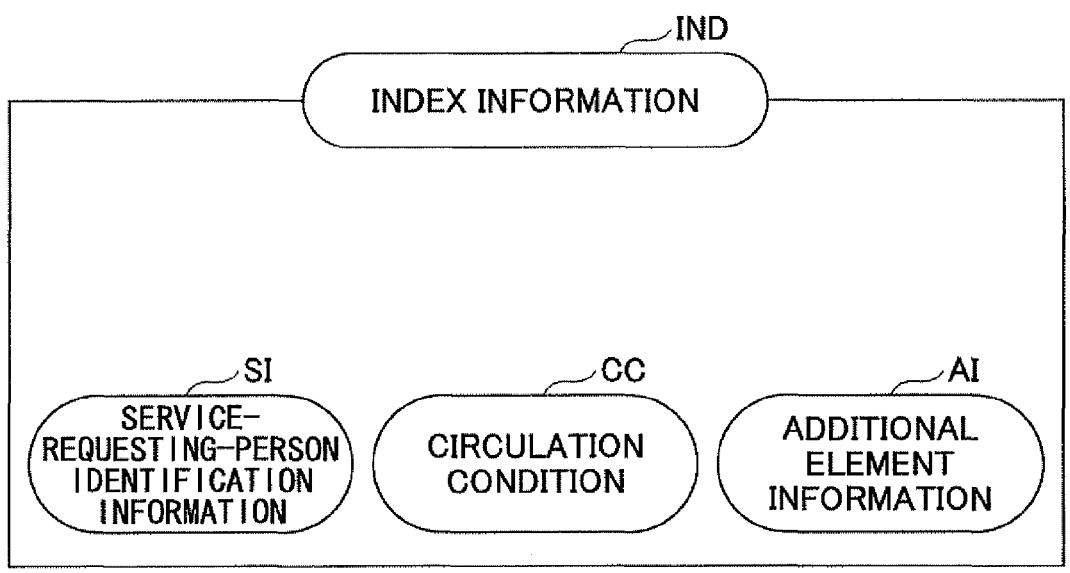
FIG. 10 is a diagram illustrating a conceptual diagram of the index information.

FIG. 8 illustrates an example of the correspondence relationship between the index information IND and the ID generating function. The index information IND (information group) corresponds to one or more of the circulation processes. As illustrated in FIG. 9, the circulation process refers to the information transfer between the terminals via the server system ASP. The circulation process may be called a distribution process. As illustrated in FIG. 10, the index information IND associated with the circulation of any digital item includes service-requesting-person identification information SI, the circulation condition CC, and additional element information AI. The "service-requesting-person identification information SI" is information for identifying a person (service requesting person or information provider) who uses the service of limited circulation of the digital item according to the embodiment of the present invention. The service-requesting-person identification information SI may be expressed as, for example, the telephone number and the IP address of the person. The "circulation condition CC" is information for designating how many times the circulation process can be allowed and whether the digital item can be transferred without limitation. The "additional element information AI" is information for setting the index information IND so as to be distinguished in various ways. As the additional element information AI, information on time at which the service is requested, date information, area information, the user ID of a specified person, and any other appropriate information, or the like may be used. As illustrated in FIG. 8, the various index information items (index 1, index 2, . . . ) correspond to the ID generating function items ($f_1(x)$, $f_2(x)$, . . . ). One of the ID generating functions corresponds to one of the index information items (one or more circulation processes). For example, let it be assumed that the user A wants to limit the circulation of the digital item on the network to N times. In this case, one index information item (index 1) is prepared based on information such as the user ID of the user A, the number of circulation times (N times), and service requesting time, and the index 1 is set so as to correspond to one of the ID generating functions $f_1(x)$. Each of the N-times circulation processes corresponds to the ID generated by the ID generating function $f_1(x)$. When the user A wants to circulate (the same or a different) digital item additional circulation times or when users other than the user A want to circulate the digital item, other index information items and ID generating functions are prepared. The correspondence relationship between the index information IND and the ID generating function is stored in a memory until at least the service is completed.

Figure 11:
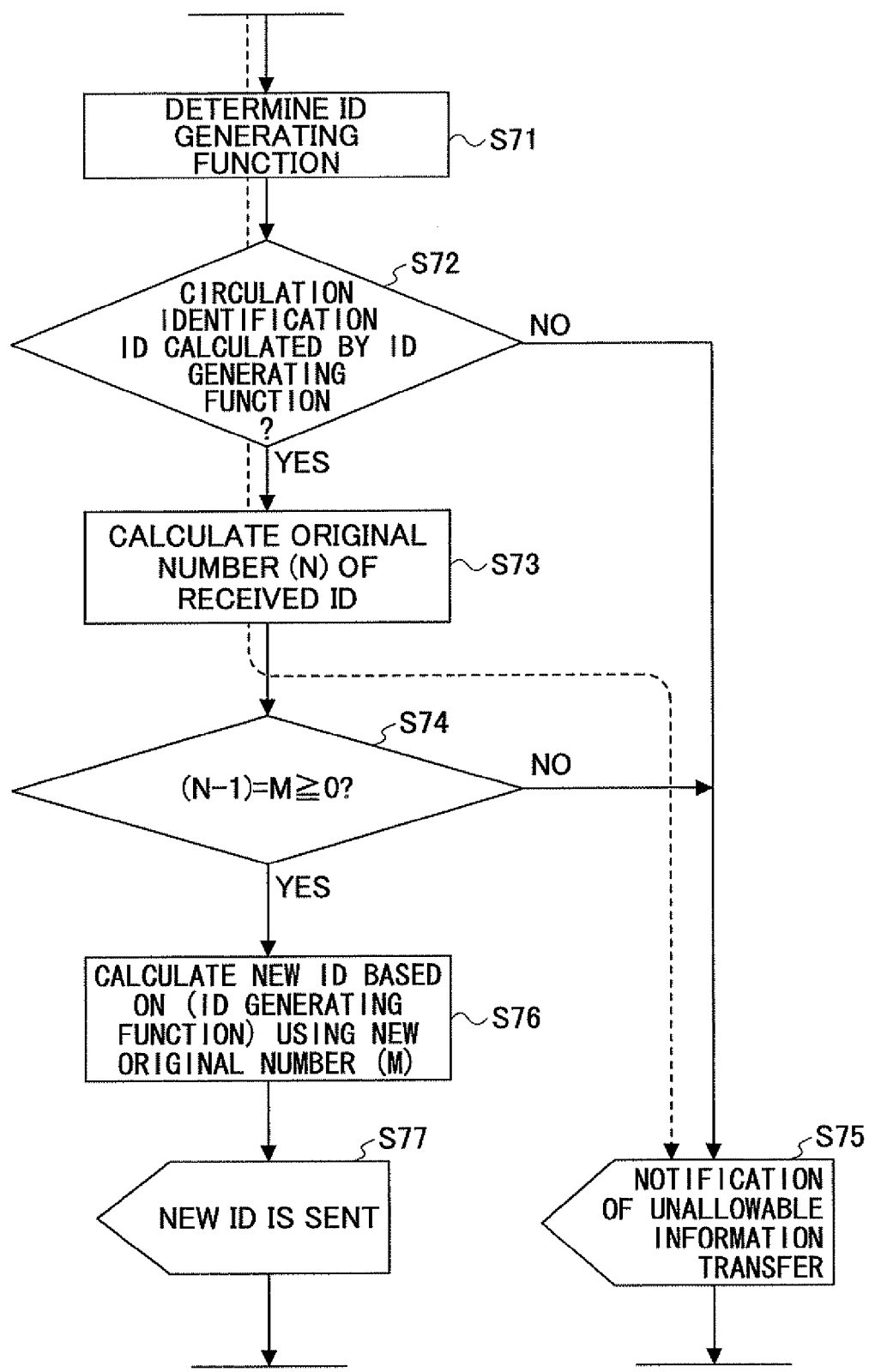
FIG. 11 is a flowchart illustrating an operations example in the server system ASP.

FIG. 11 illustrates a flowchart when the server system ASP determines whether information distribution is allowed. As an example, let it be assumed that the user A wants to limit the number of circulation times of the digital item on the network to once. The ID generating function is based on the Euler's prime number polynomial expression and expressed as $f(x)= x^2+x+41$. Any appropriate function may be used as the ID generating function. However, from the viewpoint of making it hard for an unauthorized person to specify a method for generating identification information (prime number), it is preferred to use the prime number polynomial expression. With the Euler's prime number polynomial expression, it is possible to easily find a prime number with a probability as high as 47.5% in regard to x less than or equal to $10^7$.

As a precondition of the flow in FIG. 11, the server system ASP receives a request for transferring the information on the digital item from the user A (of the terminal A). This request includes an identification information ID, and the ID (=41) is calculated by $f(N=0)=41$. The number "0" used for generating "41" is called an original number (N) (that may be expressed as $N=f^{-1}(ID)$). In an example in FIG. 11, only one circulation of the information is reflected on the circulation condition CC in such a manner that the value of N is set to 0. The server system ASP confirms the circulation identifier (ID) embedded in the digital item in each circulation process and determines whether the value of the ID is assigned to the digital item used in the circulation process and calculated by the ID generating function selected for the circulation of the digital item.

In step S72, as for the information transfer to be made, the ID generating function is determined based on the correspondence relationship between the index information IND and the ID generating function.

In step S73, the original number N=0 used for generating the received ID value "41" is calculated. In other words, $N=f^{-1}(41)$ is calculated. If it is determined that the request from the person who requests the circulation of the digital item is invalid, the server system ASP notifies the person with a message indicating that the circulation of the digital item is not allowed. In step S74, determination is made as to whether the value M=N−1 calculated by subtracting 1 from the original number is positive. Where N=0, M=−1<0 is obtained. Therefore, the flow proceeds to step S75. In step S75, the terminal B is notified of the fact that the information cannot be transferred to the terminals other than the terminal B (this notification may be confirmed in such a manner that an updated ID is not reported to the terminal B).

If it is determined that the request from the person who requests the circulation of the digital item meets the circulation condition CC or the like (the circulation of the digital item is allowed), the server system ASP generates a new circulation identifier (ID) according to the ID generating function selected for distributing the digital item, combines the new circulation identifier with digital information based on the biometric information, and circulates the combined item as the digital item capable of being circulated to the person who requests the circulation of the digital item. For example, when the user A allows the information transfer up to three times, the value of N is set to 3. In this case, the ID used for the circulation process from the terminal A to the terminal B is calculated as f(3)=53. In this case, since M=N−1=3−1=2>0 is obtained, the flow proceeds from step S74 to step S76. In step S76, an ID using the number according to M=N−1 as the original number is newly calculated. In this example, the new ID is f(2)=47. In step S77, the terminal B receives the digital item and is notified of the fact that the ID must be set to 47 in the next information transfer.

The server system ASP can record and analyze the circulation status of the digital item and the results of the circulation of the digital item. The server system ASP records user's information of the mobile information terminal of the person who uses the service and the digital item currently used and can analyze the entire service, the circulation status of the specific digital item, or the like. The server system ASP can also notify the information provider of analysis results on the circulation of the digital item provided by the information provider and perform documentation processing to generate a report.

Figure 12:
FIG. 12 is a diagram illustrating an example of the information transfer.

FIG. 12 illustrates how the values of the ID and M are changed when the information transfer of the digital item is allowed up to three times. The flow in FIG. 11 proceeds from step S74 to step S76 so long as the value of M is positive, and the destination terminal is notified of the new ID. In the case of the information transfer from terminal D to terminal E, since ID=41 and the original number O=f$^{-1}$ (41) are obtained, the flow in FIG. 11 proceeds from step S74 to step S75. As a result, the terminal E is notified of the fact that the information transfer of the digital item is not further allowed.

The ID generating function is not limited to the above function. It is also possible to apply the elliptic curve equation $y^2=x^3+ax^2+bx+c$ as the ID generating function and use the integer solutions and the rational number solutions of the equation as the identifier (ID). Let it be assumed that the elliptic curve equation applied by the server system ASP to the circulation process control of the digital item is, for example, $y^2=x^3+17$. The integer solutions (−2,3), (−1,4), and (2,5) of the equation may be used as the identifier (ID). Alternatively, it is also possible to find the linear equation that passes two rational points (points having coordinates as rational numbers) P=(−2,3) and Q=(2,5) satisfying $y^2=x^3+17$ and use as the identifier (ID) intersecting points (1/4, 33/8) other than P and Q between the linear line and the elliptic curve.

Moreover, it is also possible to use as the identifier (ID) a solution with p on the elliptic curve as a modulus and the number of the solutions Np with p as the modulus independently or in combination.

For example, a relationship between the solution with p on $y^2=x^3+x$ as a modulus and the number of the solutions Np is as follows.

p=2 (0,0), (1,0) (where p=2, the number of the solutions Np is 2)

p=3 (0,0), (2,1), (2,2) (where p=3, the number of the solutions is 3)

p=5 (0,0), (2,0), (3,0) (where p=5, the number of the solutions is 3)

p=7 (0,0), (1,3), (1,4), (3,3), (3,4), (5,2), (5,5) (where p=7, the number of the solutions is 7)

p=11 (0,0), (5,3), (5,8), (7,3), (7,8), (8,5), (8,6), (9,1), (9,10), (10,3), (10,8) (where p=11, the number of the solutions is 11)

p=13 (0,0), (2,6), (2,7), (3,2), (3,11), (4,4), (4,9), (5,0), (6,1), (6,12), (7,5), (7,8), (8,0), (9,6), (9,7), (10,3), (10,10), (11,4), (11,9) (where p=13, the number of the solutions is 19)

Accordingly, the solutions with p on $y^2=x^3+x$ as the modulus and the number of the solutions Np are as follows.

P=2, 3, 5, 7, 11, 13, 17, 19, 23, 29, 31, 37, 41, 43, 47, 53, 59, 61, 67, 71, . . . .

Np=2, 3, 3, 7, 11, 19, 15, 19, 23, 19, 31, 35, 31, 43, 47, 67, 59, 51, 67, 71, . . . .

For example, let it be assumed that the number of the circulation times of the information is limited to three times. Among the above solutions (x,y), x=2 is obtained when p is 3, 5, 13, and the like. Therefore, it may be configured so that the ID for the first information transfer is set to 3, the ID for the second information transfer is set to 5, and the ID for the third information transfer is set to 13.

Generally, in order to find the solution of an elliptic curve equation with p as a modulus $y^2=x^3+ax^2+bx+c$, x (0, 1, 2, . . . p−1) is substituted into the equation to determine whether $y^2=x^3+ax^2+bx+c$ into which each x is substituted indicates a square number. Thus, the elliptic curve equation can be used as the ID generating function retaining a high level of security and is excellent in economical efficiency. The ID generating function is not limited to the Euler's prime number polynomial equation and the elliptic curve equation, but any appropriate function may be used. However, from the viewpoint of realizing a high level of security, it is preferred to use these functions.

Let it be assumed that the digital item (representing the entire digital item including the identifier (ID)) is illegally copied and misappropriated in the circulation process. However, even if the illegally-copied ID is decoded (it turns out that the ID is 43), it is not possible to specify which method is used for finding the identifier (ID). Accordingly, in this case, the circulation of the digital item is not allowed on the network. The server system ASP defines the elliptic curve equation or the like for each digital item to be circulated or each circulation process, thereby making it possible to prevent the digital item from being illegally circulated on the network. Particularly, it is possible to reliably ensure security of the privacy of an individual such as the digital item including the biometric information.

FIRST EMBODIMENT

Figure 13A:
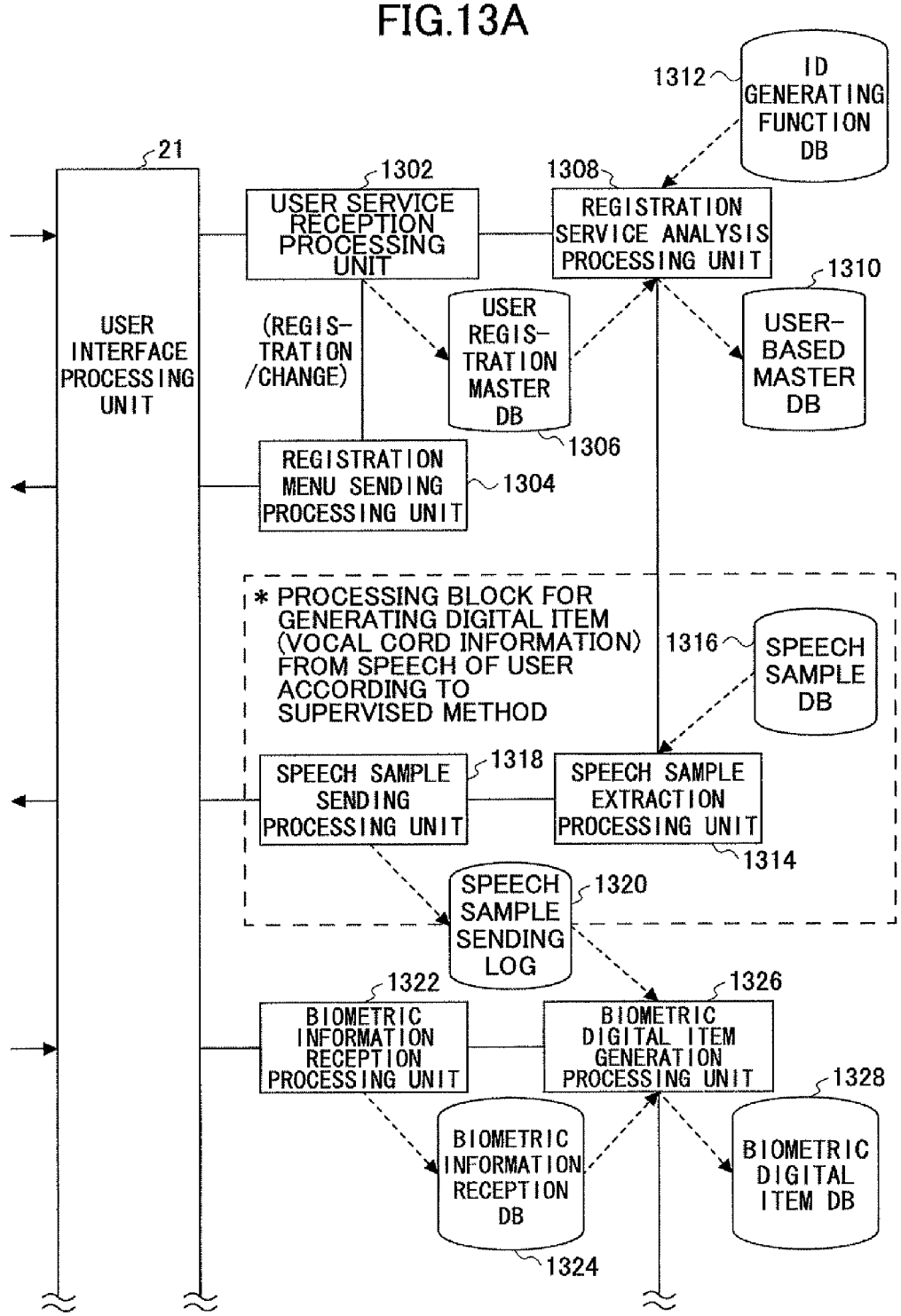
FIG. 13A is a processing block diagram in the server system ASP.
Figure 13B:
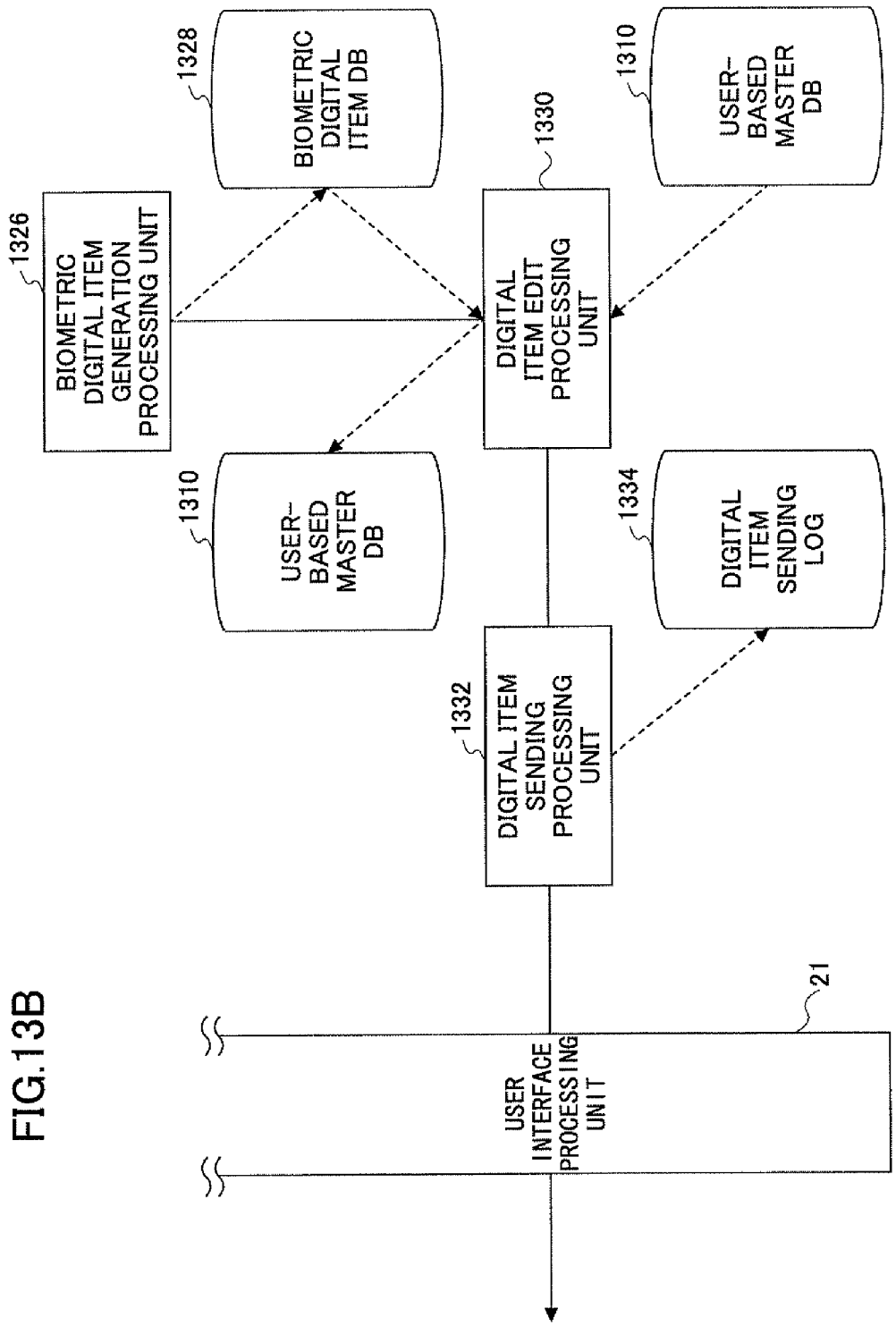
FIG. 13B is a processing block diagram in the server system ASP.

FIGS. 13A and 13B illustrate processing block diagrams in the server system ASP according to the embodiment of the present invention. The user who uses the service of circulating the digital item including the biometric information makes registration for the service in advance with respect to the server system ASP.

The server system ASP illustrated in FIG. 13A sends and receives information to and from the mobile information terminal of the user through the user interface processing unit 21. The content of the received information is determined by a user service reception processing unit 1302.

When the "registration" for the service is newly requested by the user, a registration menu is sent from a registration menu sending processing unit 1304 to the mobile information terminal of the user via the user interface processing unit 21. The registration menu having registered content including, for example, "circulation request" as an alternative is sent to the user.

The user inputs an information category where the digital item is desired to be circulated or used and the attribute information (gender, matters of concern, or the like) of the user necessary for distributing the digital item by referring to a registration menu screen displayed on the screen of the mobile information terminal, and sends the registered content to the server system ASP. The user service reception processing unit 1302 stores the received registered content in a user registration master DB 1306, while analyzing the same with a registration service analysis processing unit 1308. The analyzed registered content is stored in a user-based master DB 1310 classified for each attribute of the user.

In addition to the "registration" for the service, the server system ASP can receive requests such as "change" of the registered content, "start," "stop," and "cancel" of the service, and the like from the user. These requests are determined by the user service reception processing unit 1302. When the "change" of the registered content is requested by the user, the registration menu is sent from the registration menu sending processing unit 1304 to the mobile information terminal of the user in the same manner as the new registration for the service. Then, the server system ASP receives the changed registered content from the user, whereby the user registration master DB 1306 and the user-based master DB 1310 are rewritten.

When the "cancel" of the service is requested by the user, the user service reception processing unit 1302 and the registration service analysis processing unit 1308 delete information on the user from the user registration master DB 1306 and the user-based master DB 1310, respectively.

When the "stop" of the service is requested by the user, the information on the user in the user registration master DB 1306 and the user-based master DB 1310 is deactivated.

When the "start" of the service is requested by the user, the information on the user in the user registration master DB 1306 and the user-based master DB 1310 is activated. At the same time, a speech sample extraction processing unit 1314 extracts an appropriate speech sample from those registered in a speech sample DB 1316. The extracted speech sample is sent to the mobile information terminal of the user via a speech sample sending processing unit 1318 and the user interface processing unit 21. The speech sample sending processing unit 1318 records the speech sample sent to the mobile information terminal of the user in a speech sample sending log 1320.

Note that the content described in this embodiment assumes the generation of the vocal cord chip VCC as the digital item from the speech (voice information) spoken by the user according to the supervised method. However, the embodiment of the present invention is not limited to the vocal cord chip VCC, and biometric information other than vocal may be used.

The voice information spoken by the user in accordance with the speech sample is received by a biometric information reception processing unit 1322 via the user interface processing unit 21 and stored in a biometric information reception DB 1324. A biometric digital item generation processing unit 1326 generates the digital item (vocal cord chip) by using the speech sample sending log 1320 and the received voice information and stores the same in a biometric digital item DB 1328.

A digital item edit processing unit 1330 in FIG. 13B edits the definitive digital item (content) to be circulated on the network based on the information from the biometric digital item DB 1328 and the user-based master DB 1310. The biometric digital item DB 1328 stores the biometric digital information generated based on the biometric information (here, the voice information) of the user. The user-based master DB 1310 stores the circulation condition identifier (ID) generated based on the ID generating function determined by the server system ASP, and the like.

The edited digital item is stored in the user-based master DB 1310 and sent to the mobile information terminal of the user via the digital item sending processing unit 1332 and the user interface processing unit 21. Note that the digital item sending processing unit 1332 records the digital item sent to the mobile information terminal of the user in a digital item sending log 1334.

FIG. 14A illustrates a processing sequence when the vocal cord chip VCC is generated, in which a call processing sequence corresponds to the processing in the part encircled by a dashed-line frame in FIGS. 4 and 13A. In step S81, terminal A requests the server system ASP to provide the service. In step S82, the server system ASP extracts an appropriate speech sample from the speech sample DB 1316 in accordance with the request and sends the extracted speech sample to the terminal A. In step S83, the user of the terminal A speaks in accordance with the speech sample, and the spoken voice SV is sent to the server system ASP as speech information. The procedures (steps S82 and S83) related to the sending of the speech sample and the collection of the speech information may be performed more than once as occasion demands. In step S84, the vocal cord chip VCC is generated from the collected speech information. In step S85, the vocal cord chip VCC is sent to the terminal A. The user of the terminal A confirms the acquisition of the vocal cord chip VCC and disconnects the call (step S86).

Figure 15:
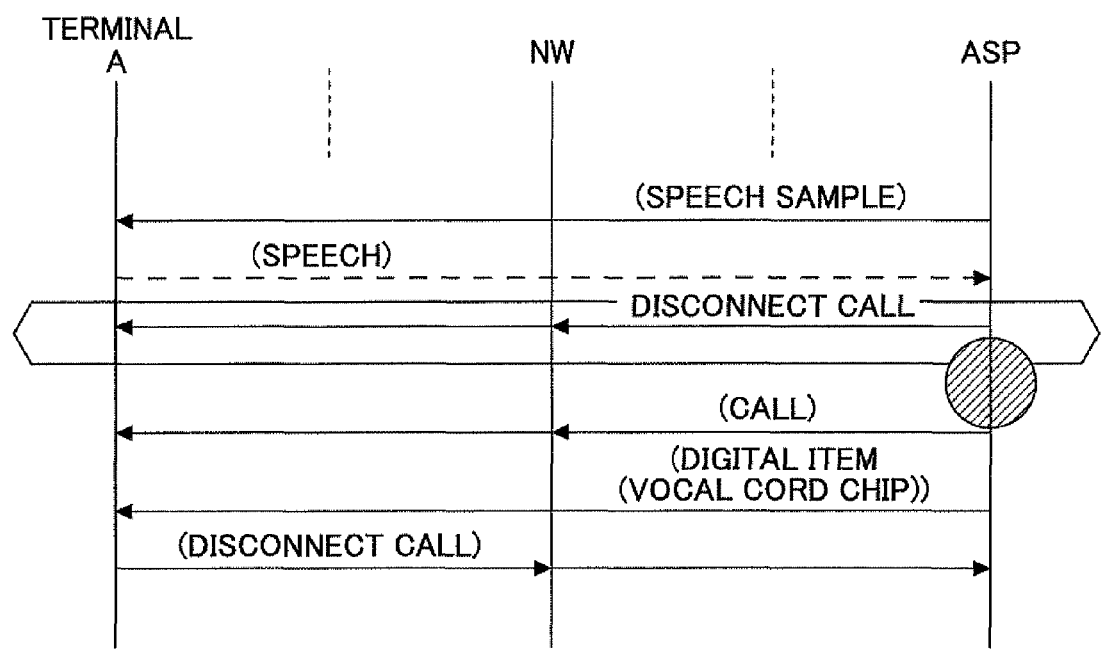
FIG. 15 is another flowchart illustrating a procedure example of preparing the digital item including the biometric information.

Note that when the processing in step S84 takes long time, a connection between the terminal A and the server system ASP may be temporarily released and established again after the generation of the vocal cord chip VCC from the viewpoint of saving a call fee (FIG. 15). This is because the biometric information has many types as described above and the time required for the processing depends on the types of the biometric information.

Figure 14B:
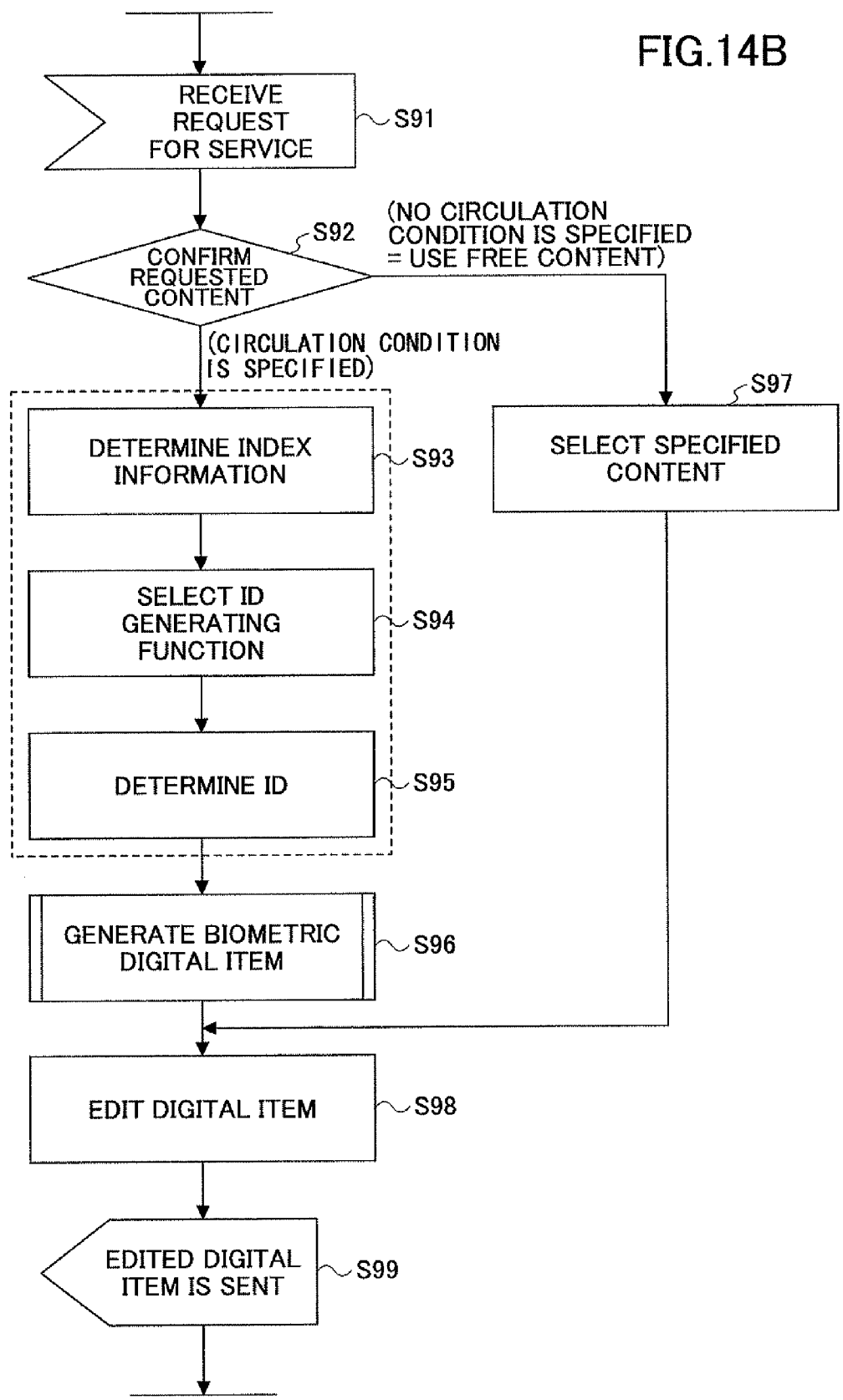
FIG. 14B is a flowchart illustrating an operations example in the server system ASP.

FIG. 14B illustrates a flowchart showing an example of the operations performed by the server system ASP until the vocal cord chip VCC is generated since the request for the service from terminal A. In step S91, the request for the service from the user is sent to the server system ASP. In step S92, determination is made as to whether the content of the service requested by the user refers to the information distribution service defining the circulation condition CC. If the service defining the circulation condition CC is requested by the user, the flow proceeds to step S93. In step S93, the index information IND is specified. In step S94, one of the ID generating functions is selected from those uniquely determined by the server system ASP and is set so as to correspond to the index information IND determined in step S93. In step S95, the circulation identifier (ID) applied to the circulation process of the digital item is determined based on the selected ID generating function and the circulation condition CC (particularly, the number of circulation times). In step S96, the biometric information is generated. If the biometric information is the vocal cord chip VCC, it is assumed that the speech sample is sent to the user in, for example, step S93 and the voice information is collected from the user. On the other hand, when the information distribution requested by the user is to distribute specified content, the flow proceeds from step S92 to step S97. The specified content is typically free content capable of being circulated without limitation. In this case, the flow directly proceeds to step S98. In step S98, the digital item is edited, and the signal including the ID in accordance with the number of circulation times, the biometric information, and the like is generated and sent to the user (step S99). In the case of the specified content, the digital item is edited so as to be circulated without accompanying a special ID prepared when content other than the specified content is circulated, and sent to the user.

Figure 16:
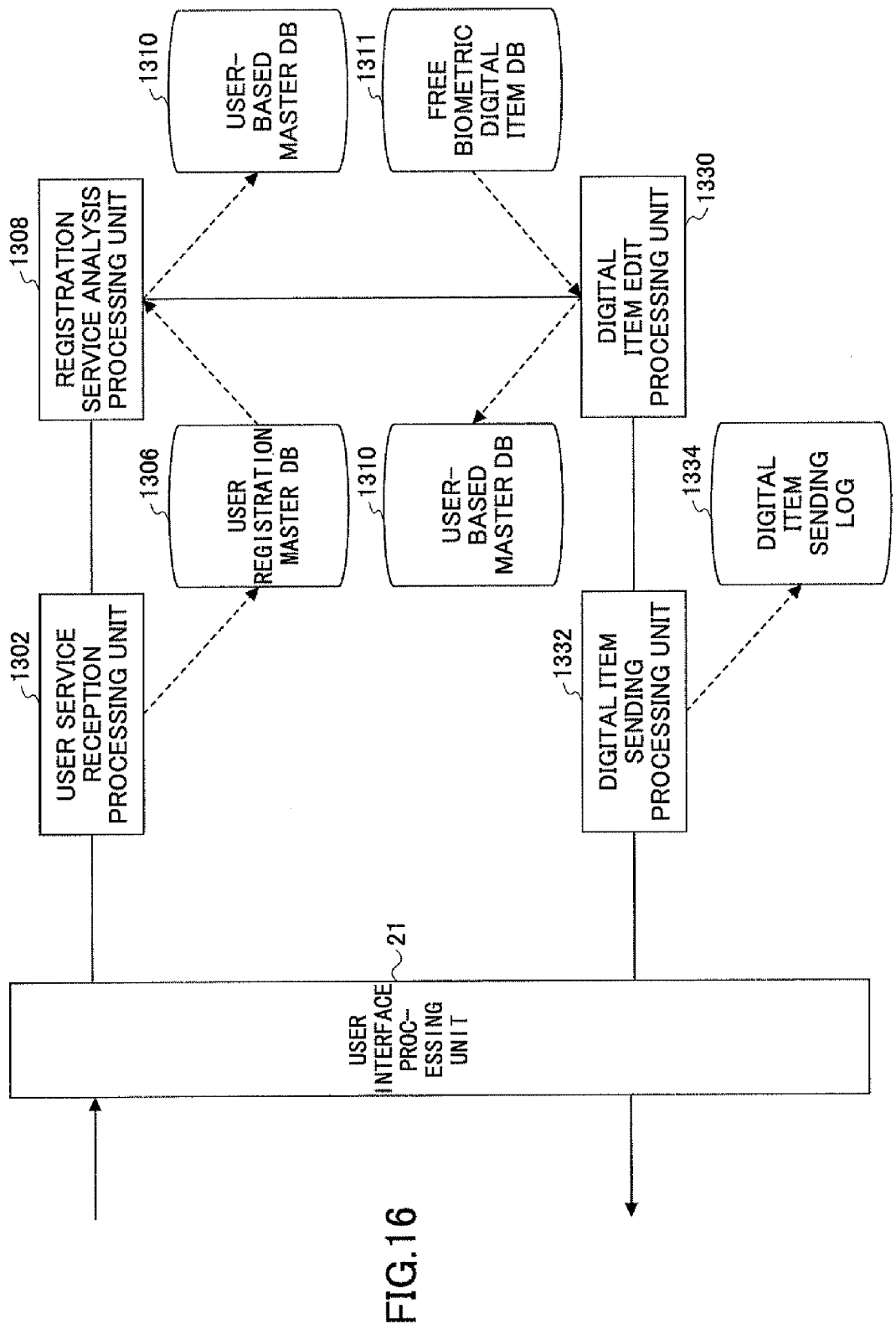
FIG. 16 is a processing block diagram related to processing for transferring the free content.

FIG. 16 illustrates a processing block diagram for processing the digital item (called free content or a free biometric digital item) capable of being circulated without limitation on the network.

When the user service reception processing unit 1302 receives the request for the service from the user, the content of the request is stored in the user registration master DB 1306. On the other hand, the requested service is analyzed by the registration service analysis processing unit 1308, and an analysis result is stored in the user-based master DB 1310.

When the analysis by the registration service analysis processing unit 1308 determines that the request for the service from the user is to use the free biometric digital item, the digital item edit processing unit 1330 extracts the content requested by the user from the free biometric digital item DB 1311 and coordinates the circulation condition CC (for example, invalidate the number of circulation times) to edit the definitive digital item. The edited free digital item is sent to the mobile information terminal of the user via the digital item sending processing unit 1332 and the user interface processing unit 21. Note that the digital item sending processing unit 1332 records the free digital item sent to the mobile terminal of the user in the digital item sending log 1334.

Note that according to the embodiment of the present invention, it is possible to cooperate with the information provider that provides the biometric digital item as the content to be circulated on the network. The processing of the server system ASP is generally performed as follows (the processing blocks used may be the same as those described above).

The server system ASP sends and receives information to and from the information provider through an information-provider interface processing unit (corresponding to the user interface processing unit 21). The content of the received information is determined by an information-provider registration reception processing unit (corresponding to the user service reception processing unit 1302).

When "registration" for the service is newly requested by the information provider, the information-provider registration reception processing unit sends a registration menu indicating registered content such as circulation content from a registration menu sending processing unit (corresponding to the registration menu sending processing unit 1304) to the information provider via the information-provider interface processing unit.

The information provider sends the address of the information provider, the content information, the circulation condition CC, or the like to the server system ASP in accordance with the received registration menu. The information-provider registration reception processing unit stores the received registered content in the information-provider registration master DB 1306. On the other hand, the registered content is analyzed by a registration information analysis processing unit (corresponding to the registration service analysis processing unit 1308) and stored in an information-provider registration-information-based master DB (corresponding to the user-based master DB 1310) classified based on the circulation condition CC or the like.

In addition to the "registration" for the content, the server system ASP can receive requests such as "change" of the registered content, "start," "stop," and "cancel" of the service, and the like from the information provider.

These requests are determined by the information-provider registration reception processing unit. When the "change" of the registered content is requested by the information provider, the registration menu is sent from the registration menu sending processing unit to the information provider in the same manner as the registration of the content. Then, when the server system ASP receives the changed registered content from the information provider, the registered content is stored in the information-provider registration master DB and the information-provider registration-information-based master DB.

When the "cancel" of the service is requested by the information provider, the information-provider registration reception processing unit and the registration information analysis processing unit delete information on the information provider from the information-provider registration master DB and the information-provider registration-information-based master DB.

When the "stop" of the service is requested by the information provider, the information on the information provider in the information-provider registration master DB and the information-provider registration-information-based master DB is deactivated.

When the "start" of the service is requested by the information provider, the information on the user in the information-provider registration master DB and the information-provider registration-information-based master DB is activated.

Next, a description is made of processing related to a settlement procedure for using the required service. This processing is performed between the user who uses the service of circulating the biometric digital item according to the embodiment of the present invention, the information provider, and a communication company. Note that settlement processing between the communication company, the information provider, and the server system ASP is performed between correspondent financial institutions (such as banks).

Figure 17:
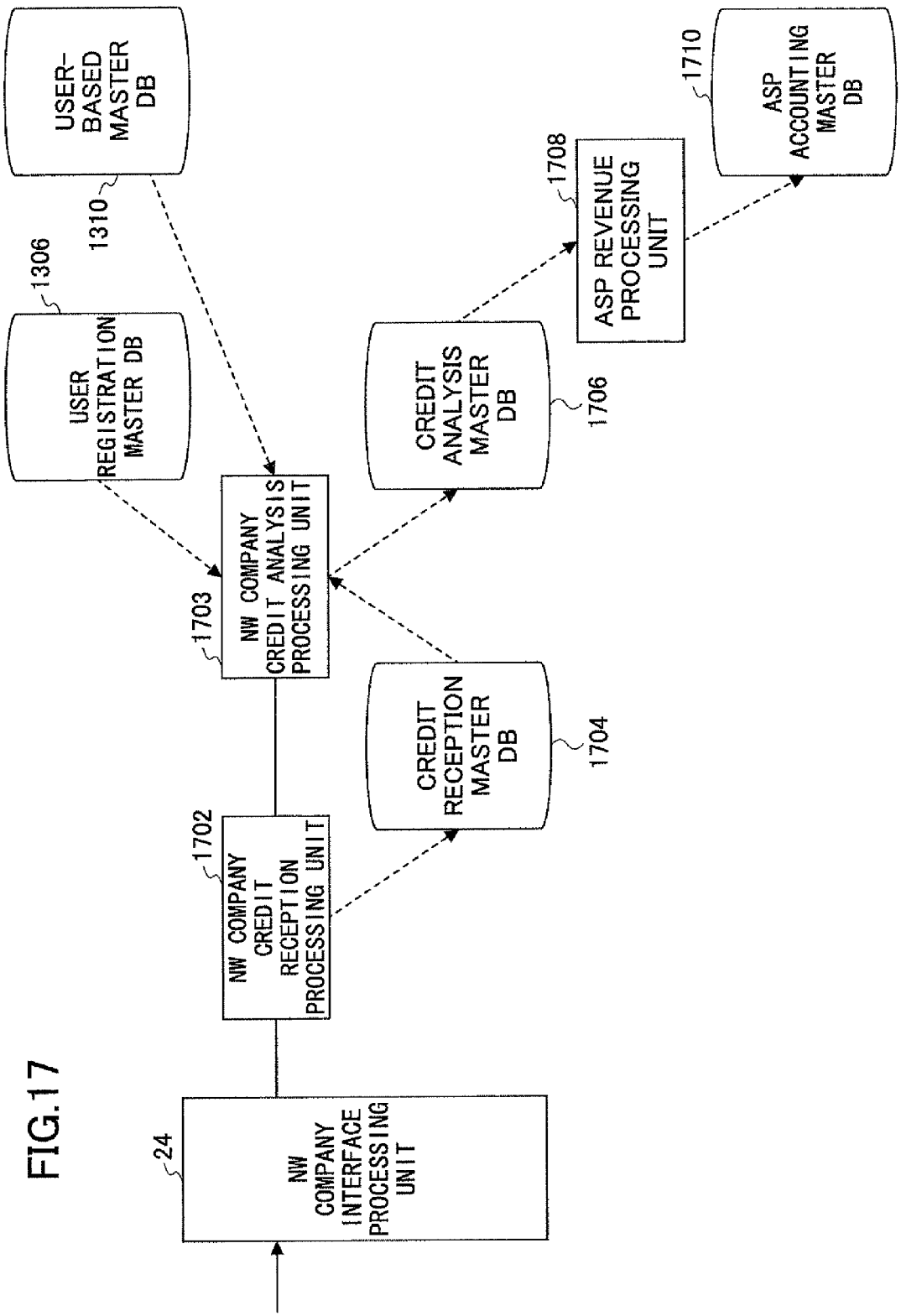
FIG. 17 is a processing block diagram related to settlement processing.

FIG. 17 illustrates a processing block diagram related to the settlement processing. Since processing for the user of the service is the same as that for the information provider, a duplicative description is omitted. In FIG. 17, the communication company (NW (network) company), substituting for the server system ASP, collects the service fee for the service and makes payment of a fee (profit) excluding a required commission or the like for the service to the server system ASP.

FIG. 17 illustrates an example of the processing block diagram based on the premise that the communication company performs a fee collection substituting operation, but the fee collection substituting operation by the communication company is not a necessity for the server system ASP according to the embodiment of the present invention. A NW company credit reception processing unit 1702 receives credit information from the communication company and at the same time stores the information in a credit reception master DB 1704. A NW company credit analysis processing unit 1703 analyzes the content of the credit information stored in the credit reception master DB 1704 by referring to the user registration master DB 1306 or the user-based master DB 1310 as occasion demands, and stores an analysis result in a credit analysis master DB 1706. An ASP revenue processing unit 1708 performs revenue processing on accounting of the server system ASP and stores a result of the processing in an ASP accounting master DB 1710.

Figure 18:
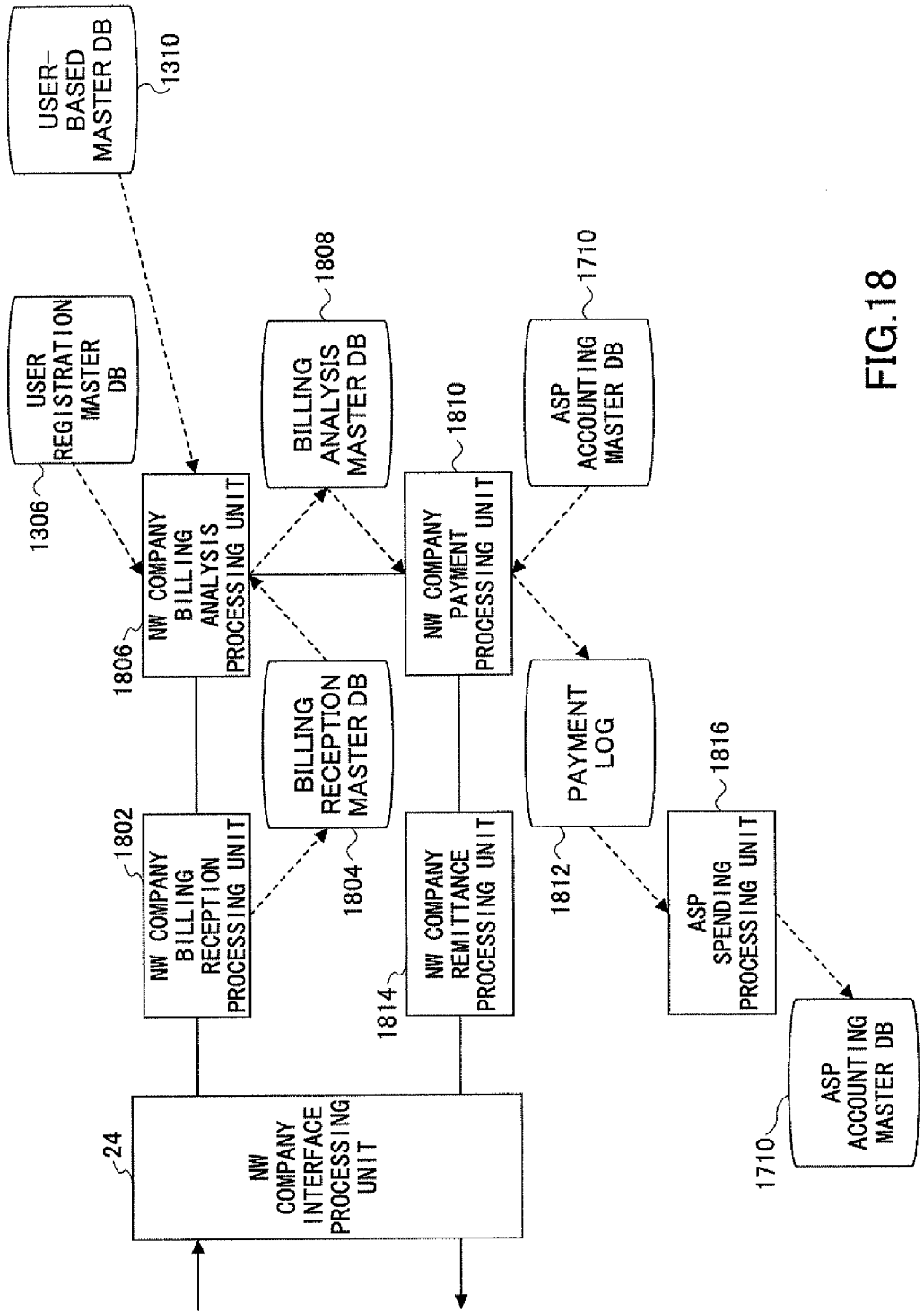
FIG. 18 is another processing block diagram related to the settlement processing.

In FIG. 18, when the server system ASP communicates with the user of the service via the commercial network of the communication company, the server system ASP is requested by the communication company to pay a communication fee and makes payment of the fee. A NW company billing reception processing unit 1802 receives a request for the communication fee from the communication company, while storing the content of the request in a billing reception master DB 1804. A NW company billing analysis processing unit 1806 analyzes the content of the request stored in the billing reception master DB 1804 by referring to the user registration master DB 1306 or the user-based master DB 1310 as occasion demands, and stores a result of the analysis in a billing analysis master DB 1808. A NW company payment processing unit 1810 performs a required billing procedure based on the ASP accounting master DB 1710 by referring to the billing analysis master DB 1808 and records a result of the procedure in a payment log 1812. The information on the recorded result is reported to the designated correspondent financial institution of the communication company via a NW company remittance processing unit 1814 and the NW company interface processing unit 24. An ASP spending processing unit 1816 performs billing processing on accounting of the server system ASP and stores a result of the processing in the ASP accounting master DB 1710. According to the embodiment of the present invention, the processing of an accounting system structured by the operating company of the server system is not limited.

Generally, the communication company charges an amount calculated by adding a call fee to the service fee for the used service of circulating the digital item to a contracted subscriber every month as a communication fee and withdraws the total amount of the communication fee from the correspondent financial institution of the contracted subscriber through an interbank settlement. Out of all the communication fees, the connection commission (for example, 10%) for the service fee is treated as the commission income of the communication company, and the remaining is paid to the service providing company (here, the server system ASP) through the interbank settlement.

Figure 19:
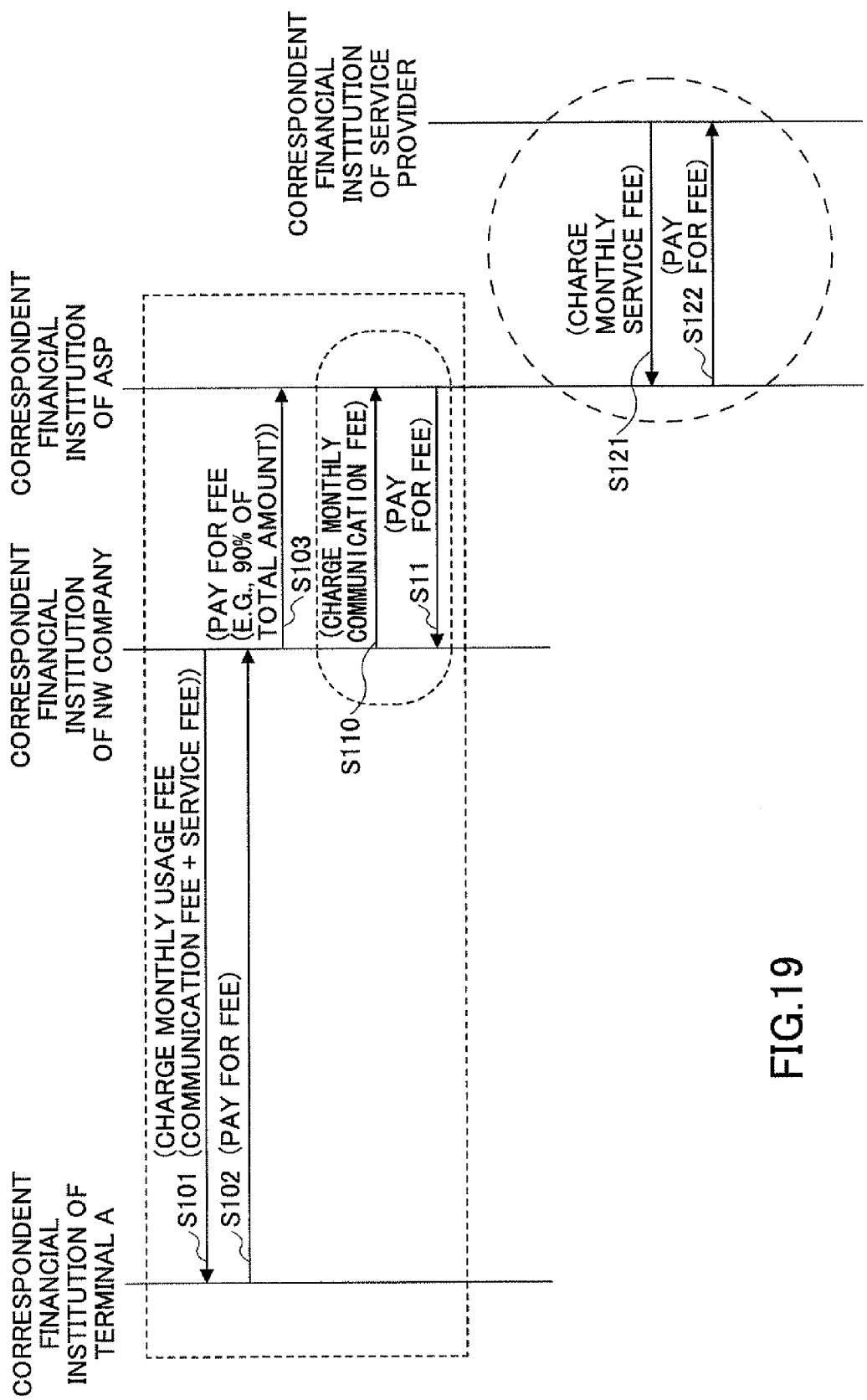
FIG. 19 is a flowchart illustrating an example of the settlement processing.

Based on the premise that a public (mobile) network company performs a service-fee collection substituting operation, FIG. 19 illustrates a settlement processing sequence when a basic processing sequence is performed in which the user of terminal A pays for the communication fee for the period until the connection is released since the request for the service according to the caller charged system in the case of the sequence illustrated in FIG. 14A.

In this case, a NW correspondent financial institution charges a monthly communication fee as illustrated in step S101. In response to this, payment is made in step S102. The NW correspondent financial institution collects, for example, 10% of the paid communication fee as a commission and pays the remaining communication fee to the ASP correspondent financial institution. For example, when the monthly communication fee is 500 yen, the total amount of the fee is withdrawn from a bank account set up for the terminal A (step S102). That is, out of a monthly communication fee of 500 yen, 50 yen is paid to the NW company as the commission and 450 yen as a remaining amount is paid to the server system ASP.

Conversely, in the case of the sequence illustrated in FIG. 15, the user of the terminal A pays for the communication fee for the period until the service is temporarily stopped since the request for the service according to the caller charged system. However, since the server system ASP establishes a connection for sending the vocal cord chip VCC, the server system ASP is responsible for the communication fee for the period until the connection is released since the establishment of the connection. In order to make a transaction of the communication fee, the communication fee is charged to the server system ASP in step S110, and payment is made in step S111. Moreover, when the biometric information such as the vocal cord chip VCC is generated by a processing institution (for example, a service provider) other than the server system ASP, the server system ASP is also responsible for the communication fee incurred at a connection between the server system ASP and the processing institution. The transaction of the communication fee in this case is illustrated inside the frame of a dashed-line circle in FIG. 19.

All examples and conditional language recited herein are intended for pedagogical purposes to aid the reader in understanding the present invention and the concepts contributed by the inventor to furthering the art, and are to be construed as being without limitation to such specifically recited examples and conditions, nor does the organization of such examples in the specification relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. An information transfer control apparatus used in a communication system in which plural communication terminals send and receive a content from each other via a network, the information transfer control apparatus comprising:
a storage unit configured to store an ID generating function for each distribution process group including at least one distribution process representing an information transfer between the plural communication terminals; and
a processor comprising:
an assigning unit configured to assign identification information to the distribution process by using the ID generating function;
a determining unit configured to determine the distribution process group, the ID generating function, and the identification information associated with a request in response to receiving, from a first one of the plural communication terminals, the request for the information transfer to be carried out from the first one of the plural communication terminals to a second one of the plural communication terminals and determines whether to allow information distribution; and
a generating unit configured to generate new identification information based on the determined ID generating function and send the new identification information to the second one of the plural communication terminals when the determining unit determines the information distribution.

2. The information transfer control apparatus according to claim 1, wherein
the distribution process group is determined by the determining unit using index information including at least information that designates a number of transfer times.

3. The information transfer control apparatus according to claim 1, wherein
information transferred in the distribution process includes biometric information on an information provider.

4. The information transfer control apparatus according to claim 1, wherein
a correspondence relationship between the distribution process group and the ID generating function is established in accordance with a request made by an information provider.

5. The information transfer control apparatus according to claim 4, wherein
the correspondence relationship established in accordance with the request made by the information provider is changed in accordance with another request made by the information provider.

6. The information transfer control apparatus according to claim 1, wherein
biometric information of an information provider is included in information transferred in the distribution process and changed in accordance with a request made by the information provider.

7. The information transfer control apparatus according to claim 1, wherein
the distribution process group is determined by the determining unit using index information including information that designates the number of transfer times and information that designates other distribution conditions.

8. The information transfer control apparatus according to claim 1, wherein
the plural communication terminals are notified of a fact that an information distribution service is capable of being provided.

9. The information transfer control apparatus according to claim 1, wherein
information received from an information provider is classified as a predetermined type, and a history of the information is managed in accordance with the predetermined type.

10. The information transfer control apparatus according to claim 1, wherein the processor further comprises:
a notifying unit configured to notify the first one of the plural communication terminals of a fact that the information distribution is not allowed.

11. The information transfer control apparatus according to claim 1, wherein
the ID generating function is expressed by an Euler's prime number polynomial expression, an elliptic equation, or an elliptic curve equation.

12. The information transfer control apparatus according to claim 1, wherein
index information used by the determining unit to determine the distribution process group includes at least time information.

13. The information transfer control apparatus according to claim 1, wherein
the identification information is uniquely assigned to each of the distribution processes.

14. The information transfer control apparatus according to claim 1, wherein
the identification information is updated every time a series of distribution processes is executed.

15. The information transfer control apparatus according to claim 1, wherein
the second one of the plural communication terminals is determined by an information provider or a system operator.

16. The information transfer control apparatus according to claim 1, wherein
index information used by the determining unit to determine the distribution process group includes the number of information transfer times and date information.

17. The information transfer control apparatus according to claim 1, wherein,
when an information distribution service is provided and a public network company collects a usage fee for the information distribution service, a fee for the information distribution service excluding a commission fee for the public network company is settled as a profit.

18. An information transfer control method used in a communication system in which plural communication terminals send and receive a content from each other via a network, the information transfer control method comprising:
storing an ID generating function for a distribution process group including at least one distribution process representing an information transfer between the plural communication terminals;
assigning identification information to the distribution process by using the ID generating function;
determining the distribution process group, the ID generating function, and the identification information associated with a request in response to receiving, from a first one of the plural communication terminals, the request for the information transfer to be carried out from the first one of the plural communication terminals to a second one of the plural communication terminals, thereby determining whether to allow information distribution;
generating new identification information based on the determined ID generating function; and
sending the new identification information to the second one of the plural communication terminals when the information distribution is allowed.

* * * * *